(12) United States Patent
Smith et al.

(10) Patent No.: US 10,658,859 B2
(45) Date of Patent: May 19, 2020

(54) TIME-DOMAIN MULTIPLEXING OF POWER AND DATA

(71) Applicant: Apple Inc., Cupertino, CA (US)

(72) Inventors: Eric Smith, Palo Alto, CA (US); Bryan R. Hinch, Mountain View, CA (US); Tommee So, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/714,891

(22) Filed: Sep. 25, 2017

(65) Prior Publication Data
US 2018/0013296 A1  Jan. 11, 2018

Related U.S. Application Data

(63) Continuation of application No. 14/487,061, filed on Sep. 15, 2014, now Pat. No. 9,774,207, which is a
(Continued)

(51) Int. Cl.
*H02J 7/00* (2006.01)
*G06F 1/26* (2006.01)

(52) U.S. Cl.
CPC .............. *H02J 7/007* (2013.01); *G06F 1/263* (2013.01); *Y10T 307/858* (2015.04)

(58) Field of Classification Search
CPC ............. H01M 10/4431; H02J 7/00911; H02J 7/0471; H02J 7/1453
(Continued)

(56) References Cited

U.S. PATENT DOCUMENTS

| | | |
|---|---|---|
| 5,321,392 A | 6/1994 | Skakoon et al. |
| 5,486,914 A | 1/1996 | Denove et al. |

(Continued)

FOREIGN PATENT DOCUMENTS

| | | |
|---|---|---|
| CN | 1282010 | 1/2001 |
| GB | 2 341 247 | 3/2000 |

(Continued)

OTHER PUBLICATIONS

Invitation to Pay Additional Fees dated Aug. 10, 2012 for PCT Patent Application No. PCT/US2012/036154, 7 pages.
(Continued)

*Primary Examiner* — Arun C Williams
(74) *Attorney, Agent, or Firm* — Kilpatrick Townsend & Stockton, LLP

(57) ABSTRACT

Circuits, methods, and apparatus that may allow an electronic device to control a power adapter. One example may provide an electronic system where an electronic device may control a power adapter through a communication channel. Data transferred in the communication channel may include the temperature of the power adapter, the charging capability of the adapter, and other types of data. In one example, power and data may share the same two wires, and the power and data may be time-division multiplexed. That is, the two wires may convey power and data at different times. Another example may include circuitry to detect a connection between the electronic device and the power adapter. Once a connection is detected, power may be transferred from the power adapter to the electronic device. This power transfer may be interrupted on occasion to transfer data between the power adapter to the electronic device.

20 Claims, 21 Drawing Sheets

Related U.S. Application Data continuation of application No. 13/286,982, filed on Nov. 1, 2011, now Pat. No. 8,836,287.

(60) Provisional application No. 61/482,195, filed on May 3, 2011.

(58) Field of Classification Search
USPC .......................................................... 320/128
See application file for complete search history.

(56) References Cited

U.S. PATENT DOCUMENTS

| | | | |
|---|---|---|---|
| 5,506,490 | A | 4/1996 | DeMuro |
| 5,539,298 | A | 7/1996 | Perkins et al. |
| 5,572,110 | A | 11/1996 | Dunstan |
| 5,734,254 | A | 3/1998 | Stephens |
| 6,163,086 | A | 12/2000 | Choo |
| 6,765,365 | B2 | 7/2004 | Kim et al. |
| 7,170,259 | B2 | 1/2007 | Veselic |
| 7,466,042 | B2 | 12/2008 | Eldredge |
| 7,471,059 | B2 | 12/2008 | Bayne et al. |
| 7,489,974 | B2 | 2/2009 | Numano |
| 7,679,317 | B2 | 3/2010 | Veselic |
| 7,683,571 | B2 | 3/2010 | Takamatsu et al. |
| 7,843,164 | B2 | 11/2010 | Hara et al. |
| 7,852,043 | B2 | 12/2010 | Kawamoto et al. |
| 8,836,287 | B2 | 9/2014 | Smith et al. |
| 2001/0020802 | A1* | 9/2001 | Kitagawa ............... H02J 7/0068 307/66 |
| 2002/0005707 | A1 | 1/2002 | Kerai et al. |
| 2002/0079866 | A1 | 6/2002 | Odaohhara |
| 2004/0001526 | A1 | 1/2004 | Hoffer et al. |
| 2004/0004458 | A1 | 1/2004 | Tanaka et al. |
| 2004/0049703 | A1 | 3/2004 | Maksimovic et al. |
| 2006/0152192 | A1 | 7/2006 | Lee et al. |
| 2008/0042616 | A1 | 2/2008 | Monks et al. |
| 2008/0164839 | A1 | 7/2008 | Kato |
| 2008/0246449 | A1* | 10/2008 | Yokozawa ............ H02J 7/0031 323/234 |
| 2009/0024858 | A1 | 1/2009 | Hijazi |
| 2009/0058356 | A1 | 3/2009 | Lee et al. |
| 2009/0167537 | A1 | 7/2009 | Feliss |
| 2009/0177900 | A1 | 7/2009 | Sawyers |
| 2009/0243548 | A1 | 10/2009 | Hoff |
| 2010/0097030 | A1 | 4/2010 | Kim et al. |
| 2012/0249066 | A1 | 10/2012 | Ichikawa |

FOREIGN PATENT DOCUMENTS

| | | |
|---|---|---|
| JP | 08-304518 | 11/1996 |
| JP | 2000-69681 | 3/2000 |
| JP | 2000-78849 | 3/2000 |
| JP | 2011-509066 | 3/2011 |
| WO | 2008/137553 | 11/2008 |
| WO | 2009/086567 | 7/2009 |

OTHER PUBLICATIONS

International Search Report dated Jan. 14, 2013, for PCT Patent Application No. PCT/US2012/036154, 17 pages.

* cited by examiner

States for Detecting a Connection

Circuitry for Detecting a Connection

States for Providing Power

Circuitry for Providing Power

Circuitry for Transmitting Data

Circuitry for Detecting a Connection

Circuitry for Detecting a Connection Including Converter

Circuitry for Converter

Circuitry for Coverter

# TIME-DOMAIN MULTIPLEXING OF POWER AND DATA

CROSS-REFERENCES TO RELATED APPLICATIONS

This application is a continuation of U.S. patent application Ser. No. 14/487,061, filed Sep. 15, 2014, which is a continuation of U.S. patent application Ser. No. 13/286,982, filed Nov. 1, 2011, which claims the benefit of U.S. provisional patent application No. 61/482,195, filed May 3, 2011, which are incorporated by reference.

BACKGROUND

The number and types of electronic devices available to consumers has increased tremendously the past few years, and that rate of increase shows no signs of abating any time soon. These electronic devices include portable devices, such as laptop, netbook, or tablet computers, cell, media, or smart phones, global positioning devices, media players, and other such devices.

These portable devices need to be supplied power during operation, and this power may come from external sources or internal sources, such as batteries. These batteries typically need to be charged using an external source, such as a power adapter. These power adapters may receive AC power from a wall outlet, car charger, or other source, and provide DC power that may be used to charge batteries.

But some devices, such as laptop computers, are very computationally powerful, and therefore require a fair amount of power. Complicating this further is the fact that users of these laptops want to be able to run their laptops for extended periods of time without having to recharge the batteries. Moreover, when a user does connect to a power source to charge the batteries, it is likely the user wants to have the batteries charge very quickly so that the user is free to disconnect from the power source.

For these reasons, many newer electronic devices have relatively large batteries. Accordingly, it has become desirable to be able to provide large amounts of charging power very quickly.

But this quick charging is not without its drawbacks. For example, this quick charging may cause high temperatures in a power adapter. To cool the power adapter, the power adapter may need to be made fairly large, such that heat may be dissipated. To avoid this, it may be desirable for an electronic device to control or adjust the power adapter in order to maintain the temperature of the power adapter.

Thus, what is needed are circuits, methods, and apparatus that allow an electronic device to control a power adapter.

SUMMARY

Accordingly, embodiments of the present invention provide circuits, methods, and apparatus that allow an electronic device to control a power adapter. In various embodiments of the present invention, this may allow the electronic device to control the power the electronic device receives.

An illustrative embodiment of the present invention may provide an electronic system where an electronic device may control a power adapter through a communication channel. That is, the electronic device may control the power adapter by sending data to the power adapter, and receiving data from the power adapter.

In various embodiments of the present invention, various types of data may be transmitted. This data may include the temperature of the power adapter, the charging capability of the adapter, and other types of data. The electronic device may use this data to adjust the current drawn from the power adapter, and thereby control the power adapter temperature. This may allow the use of smaller, less expensive, power adapters.

This data may also include a command provided by the electronic device to the power adapter to turn the power adapter off. This is particularly useful when it is more power efficient for a battery in the electronic device to provide power to the electronic device than it is for the electronic device to receive its power from the power adapter.

In other embodiments of the present invention, other types of data may be transmitted. For example, identification data that includes current and voltage capabilities, adapter identification, or version information may be transmitted. Still other embodiments of the present invention may include fault logging. Faults, such as overheating, overvoltage, or over current faults may be transmitted or stored by either or both the electronic device and the power adapter.

In some embodiments of the present invention, the electronic device being charged may act as a master device, while the power adapter may act as a slave device. In other embodiments of the present invention, the electronic device being charged may act as a slave device, while the power adapter may act as a master device. In still other embodiments of the present invention, the electronic device and the power adapter may transfer data as peers, that is, in a peer-to-peer configuration.

In various embodiments of the present invention, data may be transmitted and received over the same two conductors that provide power and ground to the electronic device. In other embodiments of the present invention, one, two, or more than two additional wires may be provided for this communication. Using the same conductors to provide power and data reduces the amount of wires in a cable from the power adapter and allows a cable of a given size to provide a maximum amount of power for its size.

In embodiments of the present invention where power and data share the same two wires, power and data may be multiplexed in various ways. For example, power and data may be frequency multiplexed. In an illustrative embodiment of the present invention, large filters that may be required for frequency multiplexing are avoided and time division multiplexing may be used. That is, the two wires may convey power and data at different times.

An illustrative embodiment of the present invention may include circuitry to detect a connection between the electronic device and the power adapter. Once a connection is detected, power may be transferred from the power adapter to the electronic device. This power transfer may be interrupted on occasion to transfer data between the power adapter and the electronic device.

This detection circuit may include circuits in a power adapter and an electronic device. The power adapter detection circuitry may include a voltage supply coupled to a detect resistor that is in series with a cable conductor. When the cable is connected to the electronic device, a system identification resistor may draw current from the power adapter voltage supply, thereby generating a voltage on the cable conductor. The voltage on the cable conductor may be detected, for example, by using an analog-to-digital converter.

The value of the voltage on the cable conductor may be used to determine the value of the system resistor, which may indicate information about the electronic device. For example, the voltage may simply indicate that a connection has been made to the electronic device. In other embodiments of the present invention, other information, such as the type of electronic device, the charge or voltage that may be accepted by the electronic device, or other aspect of the electronic device may be conveyed by the value of system resistor and resultant voltage on the cable conductor.

In other embodiments of the present invention, other detect circuitry may be employed by the power adapter. For example, in a specific embodiment of the present invention, a second resistor may be switched in parallel (or series) with the detect resistor in the power adapter. This second resistor may be switched in and a second resultant voltage on the cable conductor measured. This technique may provide two voltages that can be subtracted from each other to generate a differential measurement. This differential measurement may have a reduced sensitivity to component leakage, diode drops, and other circuit effects. In other embodiments of the present invention, the voltage supply used during detection may be varied.

In still other embodiments of the present invention, other system identification circuitry may be employed by the electronic device. In a specific embodiment of the present invention, a first resistor in parallel with a series combination of a second resistor and a diode may be used. When a low voltage is received at the electronic device, the diode may be off, and the load may appear to be the first resistor. This resistor may be used to indicate that a connection to an electronic device has been made by the power adapter. As the received voltage is increased, the diode may turn on, and the load may appear to be (approximately) the first and second resistors in parallel. The inclusion of this second resistor may be used to verify the connection. In other embodiments of the present invention, the value of the second resistor may convey other information about the electronic device, as described above.

In another specific embodiment of the present invention, a first resistor in parallel with a diode may be used. When a high voltage is received at the electronic device, the diode may clamp the voltage. As the received voltage is lowered, the diode may turn off, and the load may appear as the first resistor. Again, this two-step process may be used to verify a connection between a power adapter and an electronic device. In other embodiments the present invention, the first resistor value may convey other information about the electronic device, as described above.

These power adapters typically are connected through a cable to a connector insert. This connector insert may have a first form factor. On occasion, it may be desirable to connect such a power adapter to a legacy or other electronic device that may house a connector receptacle arranged to accept connector inserts having a second form factor. Accordingly, embodiments of the present invention may provide a converter or connector adapter having a connector receptacle to accept a connector insert having the first form factor. The converter may further include a connector insert having the second form factor. This connector adapter may further include circuitry such that the adapter may be detected by a power adapter. This connector adapter may include circuitry to provide a power connection from its connector receptacle to its connector insert. In a specific embodiment of the present invention, a resistor may be coupled between the connector receptacle and connector insert. A switch, such as a field effect transistor, may be coupled across the resistor and controlled by control circuitry. The resistor may have a value that is detected by power adapter, which may identify the resistor be a value associated with a converter or connector adapter. After detection, as power is applied by the power adapter, control circuitry may activate the switch, thereby shorting the resistor and providing power through the converter to the electronic device.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
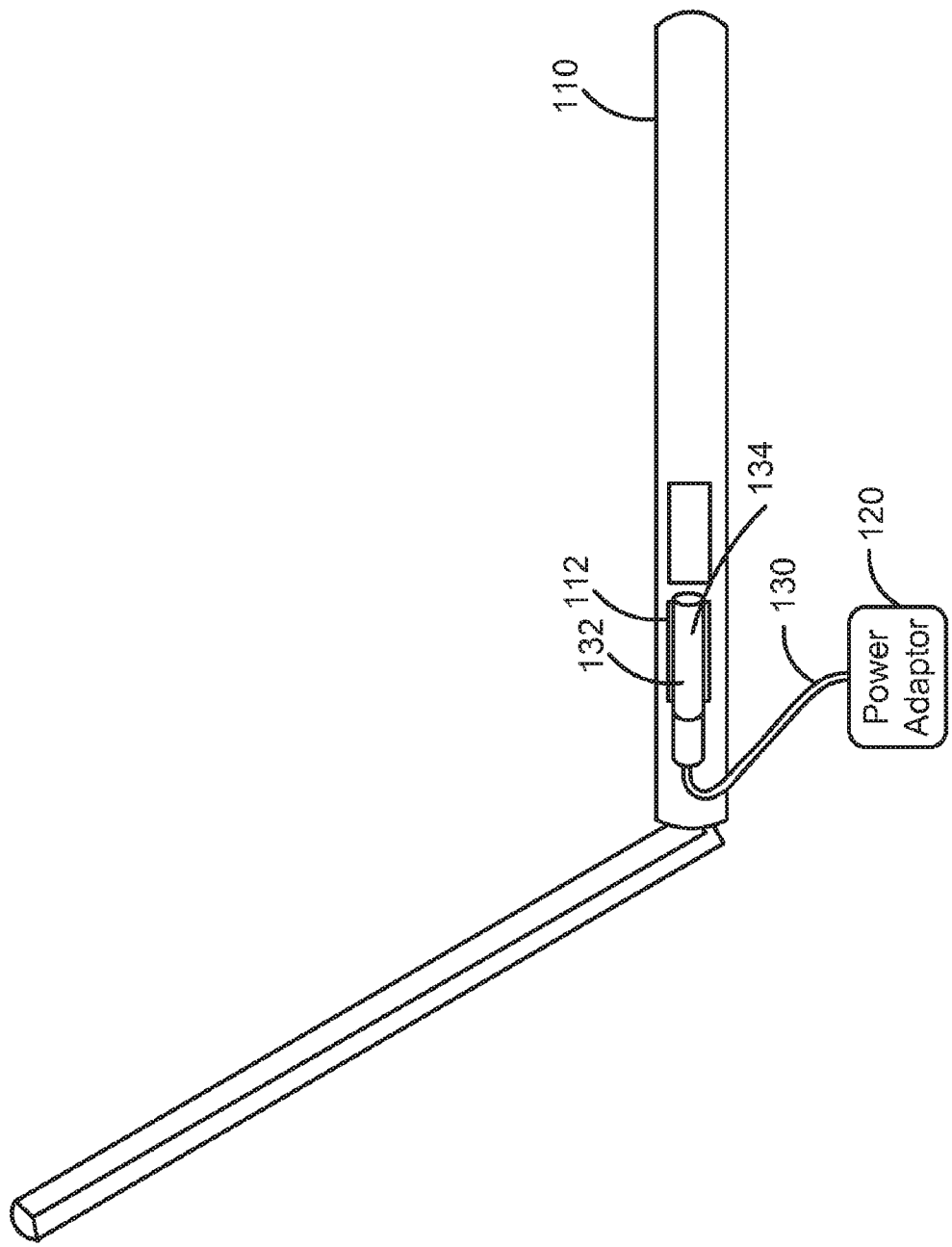
FIG. 1 illustrates an electronic system that may be improved by the incorporation of embodiments of the present invention.

FIG. 1 illustrates an electronic system that may be improved by the incorporation of embodiments of the present invention. This figure, as with the other included figures, is shown for illustrative purposes and does not limit either the possible embodiments of the present invention or the claims.

This figure includes electronic device 110. In this specific example, electronic device 110 may be a laptop computer. In other embodiments of the present invention, electronic device 110 may be a netbook or tablet computer, cell, media, or smart phone, global positioning device, media player, or other such device.

Electronic device 110 may include a battery. The battery may provide power to electronic circuits in electronic device 110. This battery may be charged using power adapter 120. Specifically, power adapter 120 may receive power from an external source, such as a wall outlet or car charger. Power adapter 120 may convert received external power, which may be AC or DC power, to DC power, and it may provide the converted DC power over cable 130 to plug 132. Plug 132 may be arranged to mate with receptacle 112 on electronic device 110. Power may be received at receptacle 112 from plug 132 and provided to the battery and electronic circuitry in electronic device 110.

Again, it may be desirable for electronic device 110 to be able to control the power received from power adapter 120. For example, electronic device 110 may monitor a temperature of power adapter 120. In this way, the electronic device may adjust the power drawn from power adapter 120 such that the temperature of power adapter 120 is held below a certain level. This may allow the use of a smaller, less expensive, power adapter 120. Also, on occasion, it may be more power efficient for electronic device 110 to draw power from its battery rather than from power adapter 120. When this occurs, electronic device 110 may turn off power adapter 120 and draw power from its battery instead.

In other embodiments of the present invention, other parameters may be controlled, monitored, or otherwise measured. For example, in a solar cell system, a maximum power point may be tracked. In other embodiments of the present invention, an electronic device may be able to give an advance warning to the adapter of an upcoming event. For example, an electronic device may be able to warn an adapter that a battery is about to be charged. This information may be used to control various supply and protection circuits in the power adapter, or for other purposes. This may allow the power adapter to be able to prepare itself to delivery the power in a more efficient manner. This may be of particular importance in fuel cell systems, for example, since the fuel cell may need a lot of time to build pressure in its conversion chamber. That is, embodiments of the present invention may be able to give a fuel cell system a prior warning of battery charging current using this communication path. Such an advance warning may be important in making this alternative fuel system practical.

Also, in various embodiments of the present invention, plug 132 may include an LED 134. LED 134 may be used to indicate a power connection between power adapter 120 and electronic device 110. Accordingly, when power adapter 120 detects a connection to electronic device 110, power adapter 120 may activate LED 134.

Accordingly, embodiments of the present invention may provide communications between power adapter 120 and electronic device 110. Embodiments of the present invention may further provide communications between power adapter 120 and circuitry associated with LED 134. In this way, electronic device 110 may read data from power adapter 120, and instruct power adapter 120 to adjust its current or turn off. Similarly, power adapter 120 may communicate with circuitry associated with LED 134, instructing LED 134 to turn off or on as needed.

Again, it may be desirable for power adapter 120 to be able to provide a maximum amount of power over cable 130 to electronic device 110. Accordingly, embodiments of the present invention provide circuitry such that these communications may occur over power conductors in cable 130. Since no additional wires are needed for this communication, all of the wire in cable 130 may be available to deliver power to electronic device 110. An example of this circuitry is shown in the following figure.

Figure 2:
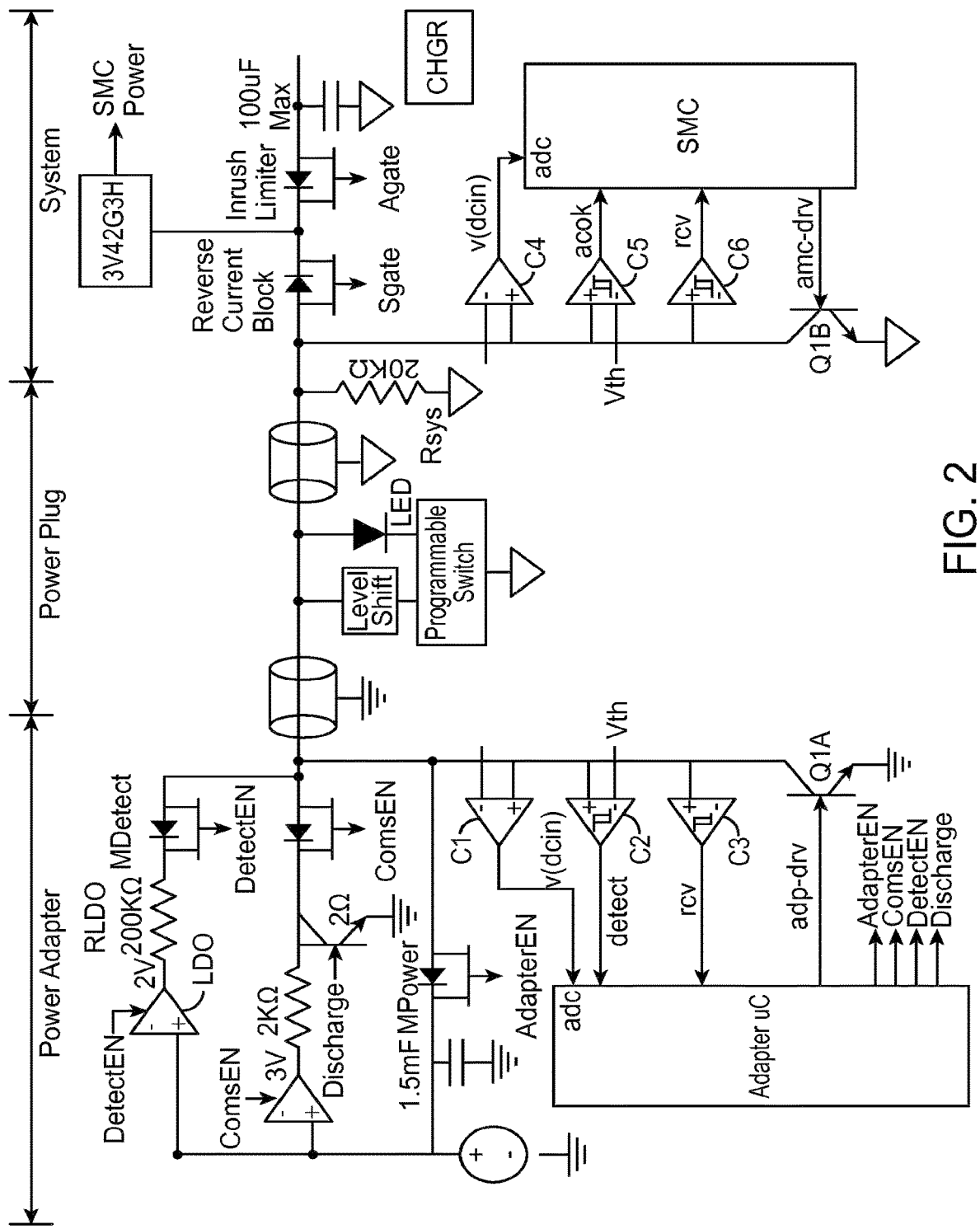
FIG. 2 is a simplified schematic of circuitry according to an embodiment of the present invention.

FIG. 2 is a simplified schematic of circuitry according to an embodiment of the present invention. This circuitry may include circuitry in a power adapter, power plug, and electronic device or system. This circuitry may include circuitry for three main functions. The first circuitry may include detection circuitry to detect the presence of a connection between a power adapter and an electronic device. The second circuitry may include power circuitry for delivering power from the power adapter to the electronic device. The third circuitry may include circuitry for a first signal path between the power adapter to the power plug and a second signal path between the power adapter and the electronic device. This circuitry is explained further in the figures below.

This circuitry may include a system management controller (SMC) in the system or electronic device, and an adapter microcontroller in the power adapter. These controllers may control states of the power adapter and the power circuitry in the electronic device. An example of state diagrams that may be used by embodiments of the present invention is shown in the following figures.

Figure 3:
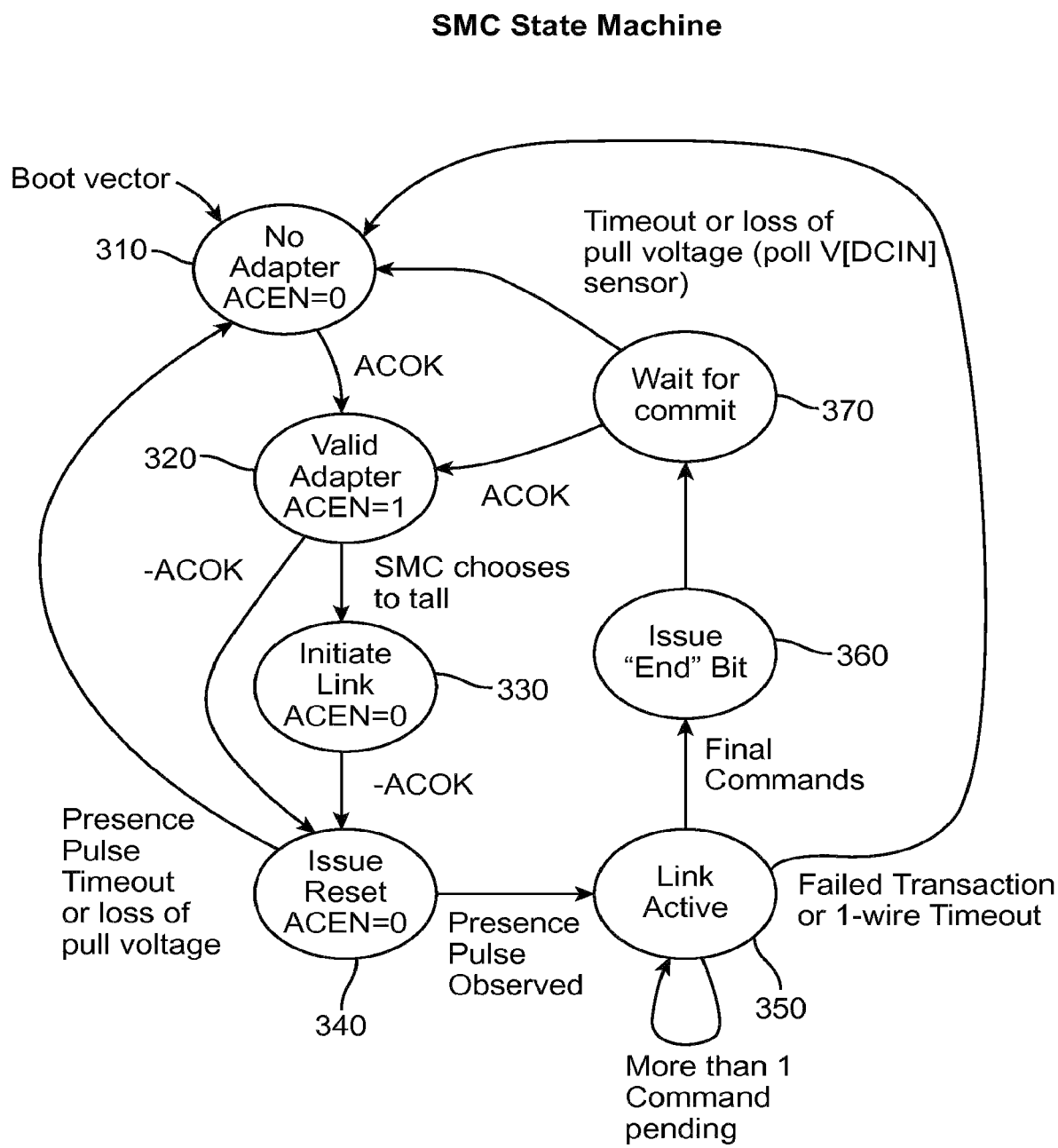
FIG. 3 illustrates a state diagram for a system management controller according to an embodiment of the present invention.

FIG. 3 illustrates a state diagram for a system management controller according to an embodiment of the present invention. Upon power up of the electronic device, state 310 may be entered. Once power is received from the power adapter, the presence of a valid power adapter may be detected in state 320.

In this state, power is received by the electronic device from the power adapter, and one of two things may happen, either the power may be removed, or the electronic device may wish to initiate communications. (In a specific embodiment of the present invention, only the electronic device can initiate communications, since such communications require the power adapter to turn off the power supplied to the electronic device, and the absence of such power may cause the electronic device to turn off when battery charge is low.) If power is disconnected, a reset signal may be issued in state 340, essentially inquiring whether the power adapter has been disconnected. If the power adapter has been disconnected, no response will be received, and the state machine may return the state 310. When the electronic device intends to initiate communications with a power adapter, state 330 is entered, and the reset signal is issued in state 340. If a return signal is observed, the link active state can be entered in state 350. In this case, data may be transferred. Once data has been transferred, an end bit in state 360 may be sent.

This end bit may instruct all of the previous commands to be executed, though in other embodiments of the present invention, commands are executed as they are received. In state 370, the electronic device may wait for a response from the power adapter. If no response is received, the electronic device may enter state 310. If a response is received, the electronic device may continue to receive power in state 320.

Figure 4:
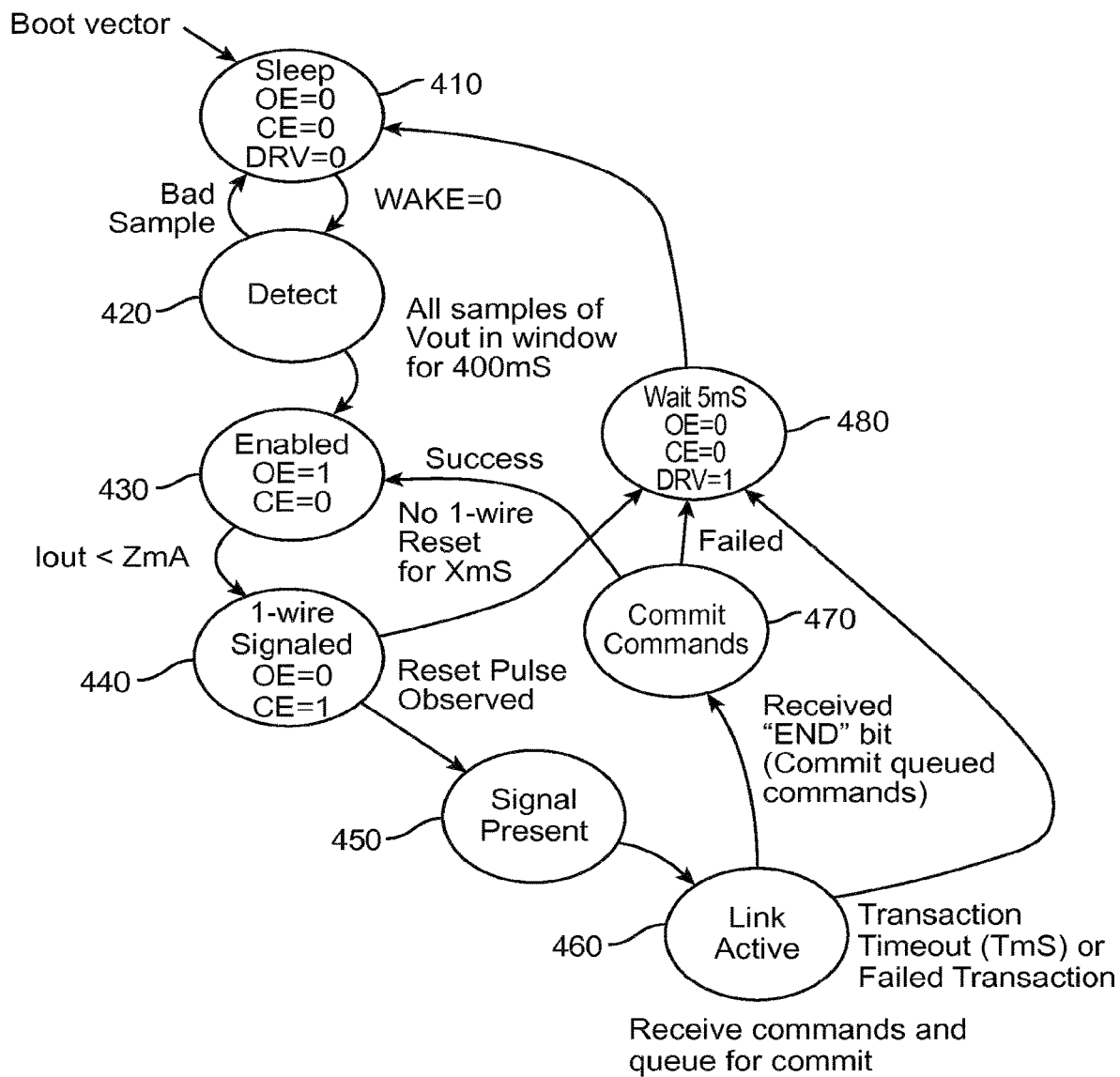
FIG. 4 illustrates various states of an adapter state machine according to an embodiment of the present invention.

FIG. 4 illustrates various states of an adapter state machine according to an embodiment of the present invention. Upon power up of the adapter, the adapter may enter a sleep mode in state 410. Once a connection to an electronic device is detected, state 420 may be entered. If this detection is stable and below specific current levels, state 440 may be entered. Once a reset pulse is observed, a response signal may be provided in state 450. Link active state 460 may be entered once the present signal has been sent. In this state, signals may be provided and received. After an end bit is received from the electronic device, the power adapter may enter state 430 and continue providing power to the electronic device.

In various embodiments of the present invention, undervoltage or over-current conditions may be detected. In such cases, power to the adapter may be cycled, thereby restarting or resetting the power adapter. An example is shown in the following figure.

Figure 5:
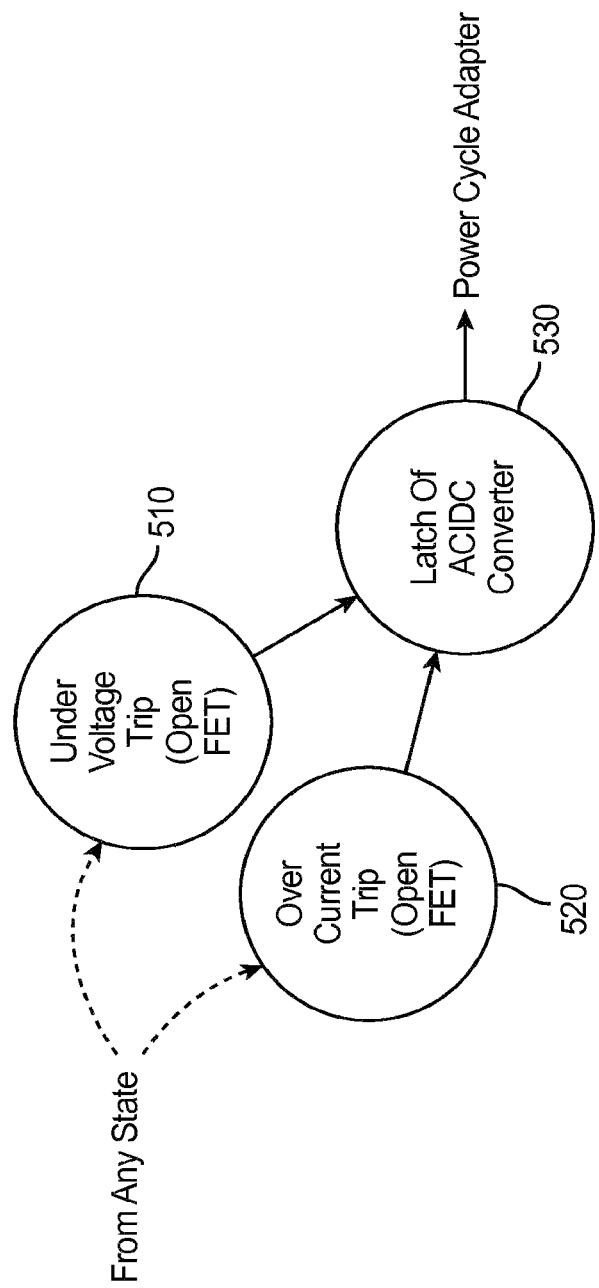
FIG. 5 is a state diagram for fault detection circuitry according to an embodiment of the present invention.

FIG. 5 is a state diagram for fault detection circuitry according to an embodiment of the present invention. When an under-voltage occurs, state 510 may be entered. When over-current condition occurs, state 520 may be entered. After either of these states is entered, the power to the adapter may be cycled, thereby resetting the adapter.

Again, in a specific embodiment of the present invention, when a power adapter is initially connected to an electronic device, that connection is detected by the power adapter. An example of the state diagrams and circuitry involved is shown in the following figures.

Figure 6:
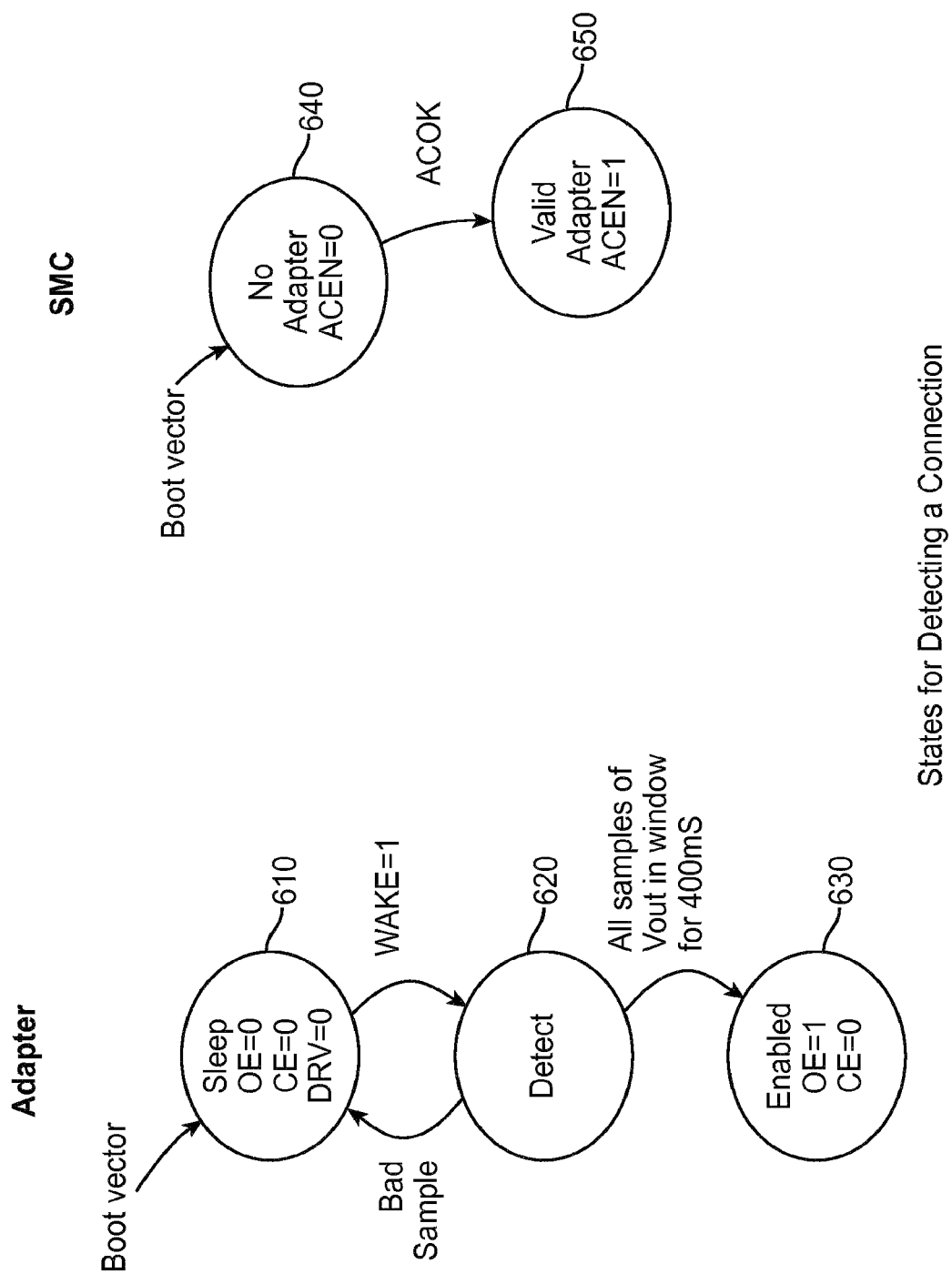
FIG. 6 illustrates a state diagram for detecting a connection between a power adapter and an electronic device according to an embodiment of the present invention.

FIG. 6 illustrates a state diagram for detecting a connection between a power adapter and an electronic device according to an embodiment of the present invention. Upon power up, the power adapter may enter stage 610. After a detection, the power adapter may enter stage 620. Power may be enabled and provided to the electronic device in state 630.

Upon power up, the electronic device may enter state 640. Once the electronic device senses that power is being provided, the electronic device may recognize that a valid adapter is present and enter state 650.

Figure 7:
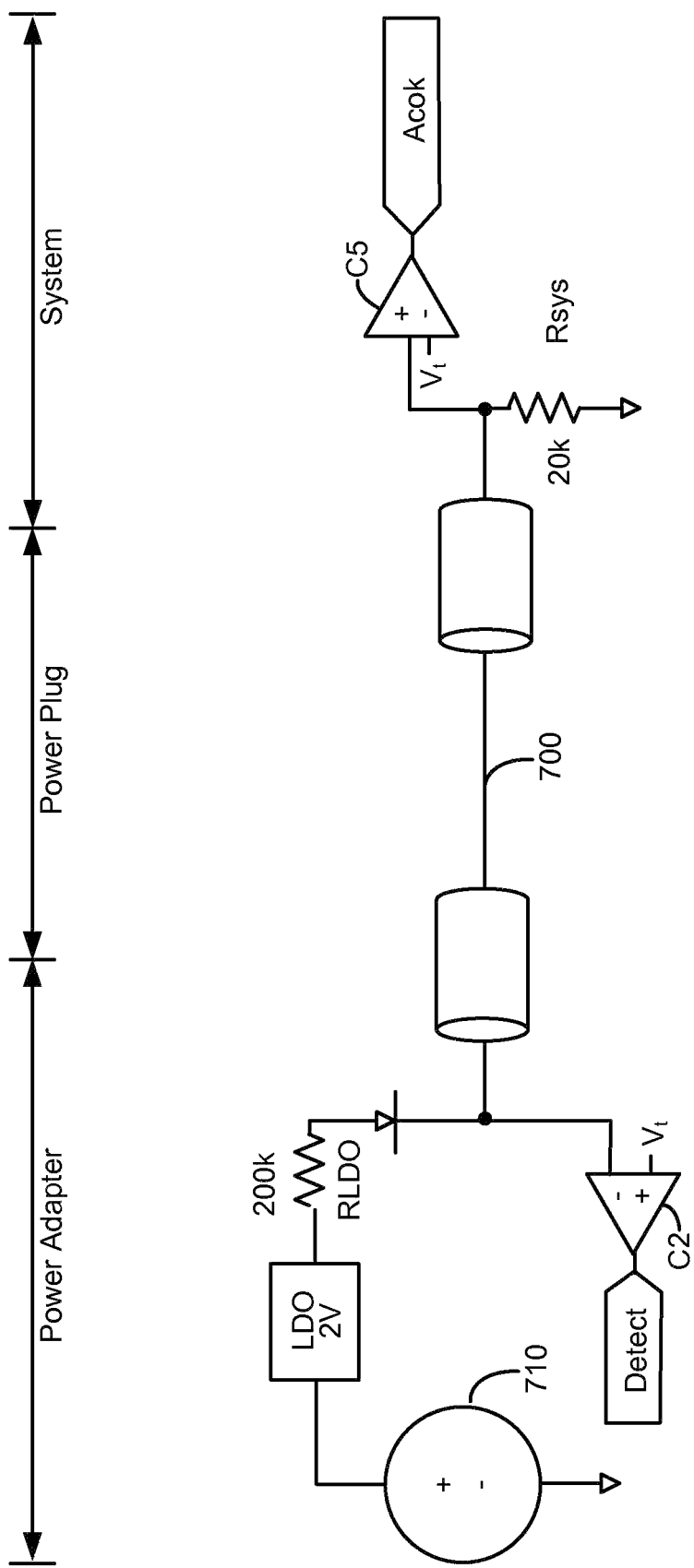
FIG. 7 illustrates circuitry for detecting a connection between a power adapter and an electronic device according to an embodiment of the present invention.

FIG. 7 illustrates circuitry for detecting a connection between a power adapter and an electronic device according to an embodiment of the present invention. When a connection between a power adapter and electronic device or system is made, wire 700 is coupled to ground through resistor Rsys. The resulting low voltage may be detected by comparator C2, which may provide a detect signal to the power adapter circuitry. This may indicate to the power adapter that a connection has been made and power may be supplied. In various embodiments of the present invention, Rsys is chosen such that a stray or "organic" resistance (such as a user's finger) likely has a different value. This helps to prevent mistaken connection detections by the power adapter.

Specifically, power supply 710 may include an LDO, which provides a voltage to resistor Rldo. This voltage may generate a current through Rldo, D1, and Rsys. Again, the resulting voltage may be detected by comparator C2, which may provide a detect signal back to the power adapter. In a specific embodiment of the present invention, comparator C5 is not switched by this event. Rather, comparator C5 is switched when full power is provided by the power adapter to the electronic device. Rsys may have various values, depending on device type. In this way, the device type being charged by the power adapter can be identified by the power adapter.

In this example, terminals of the power plug may see a large resistance in series with a low-voltage supply. This configuration may limit the current that may be drawn from the power adapter when a valid connection is not detected. In this way, when contacts on the power plug are touched by a user, significant current may not be drawn from the power adapter.

Again, once a valid connection is detected by the power adapter, power may be provided to the electronic device. Once power is received by the electronic device, one of two things may happen, either the power may become disconnected, or the electronic device may wish to initiate communications. Examples of a state diagram and associated circuitry are shown in the following figure.

Figure 8:
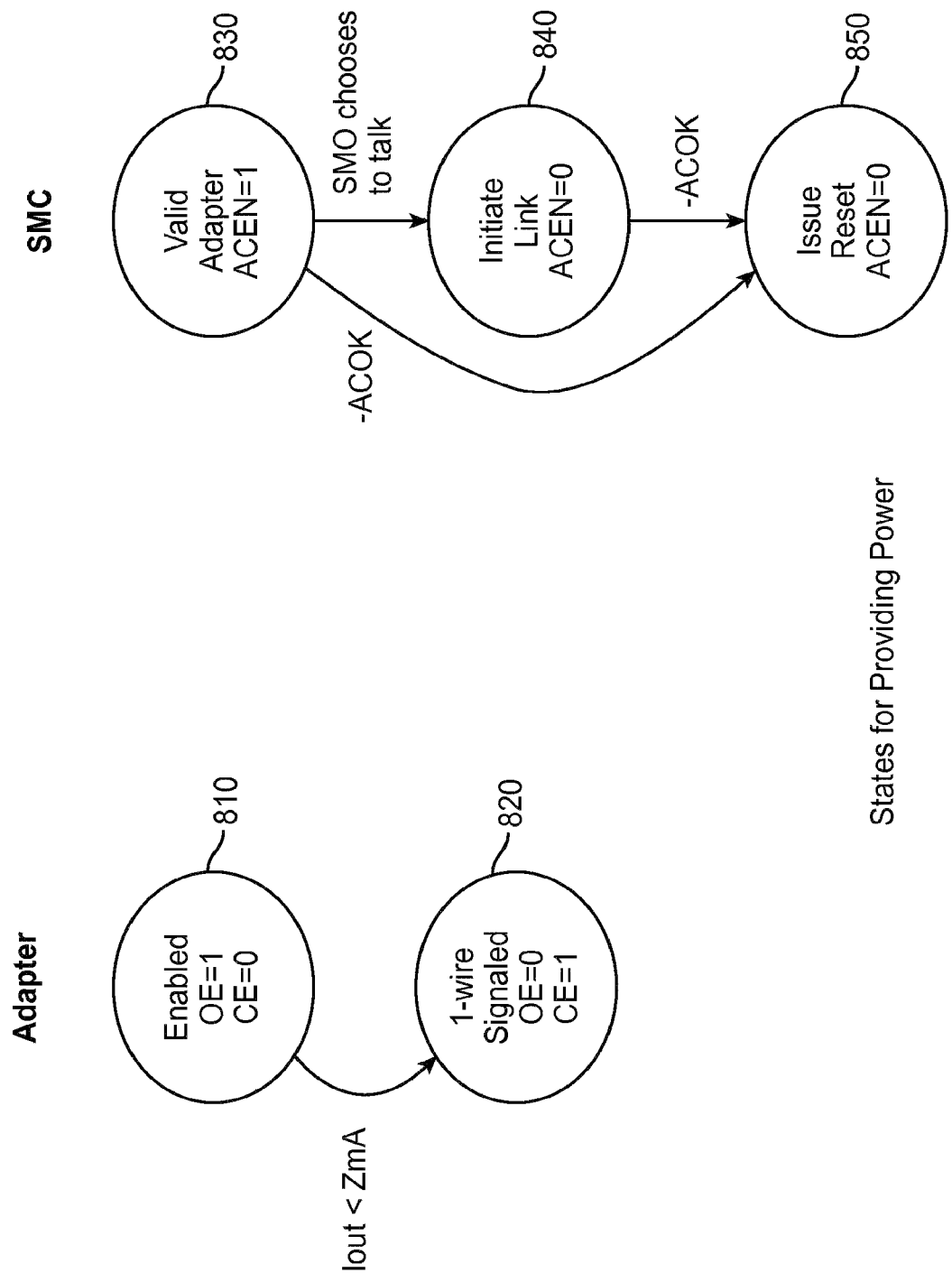
FIG. 8 illustrates a state diagram for providing power from a power adapter to an electronic device according to an embodiment of the present invention.

FIG. 8 illustrates a state diagram for providing power from a power adapter to an electronic device according to an embodiment of the present invention. Again, the power adapter may be in state 810, and thereby providing power to an electronic device. The power adapter may receive a signal from the electronic device initiating communications, and thereby entering state 820.

Similarly, the electronic device may receive power in state 830. Power may then be disconnected, whereupon the electronic device may issue a reset signal in state 850. Alternately, the electronic device may initiate communications and enter state 840. Again, a reset signal may be issued in state 850.

Figure 9:
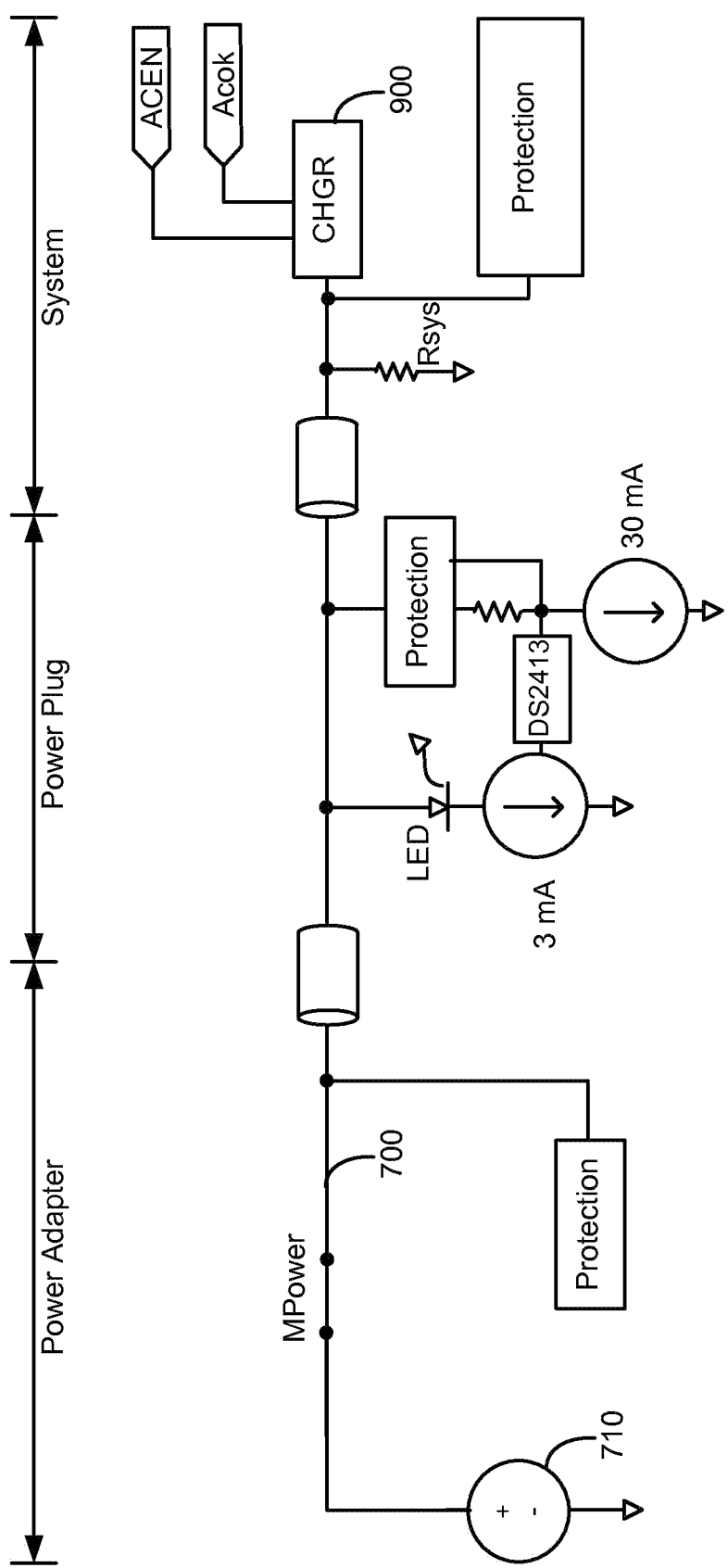
FIG. 9 illustrates circuitry for providing power from a power adapter to an electronic device according to an embodiment of the present invention.

FIG. 9 illustrates circuitry for providing power from a power adapter to an electronic device according to an embodiment of the present invention. In this example, power supply 710 is provided via power wires 700 to the electronic device. This power may be received by charger 900. Charger 900 may provide power to a battery or other circuitry in the electronic device or system.

On occasion a system may enter a low-power state, such as sleep or off. In these circumstances, power may be periodically connected to and disconnected from the load by turning transistor MPOWER on and off. The period and duty cycle of this may be varied, depending on the power drawn by the system in the lower-power state. In a specific embodiment, in an off state, a duty cycle may be 300:1 (off-to-on ratio), while in a sleep state the ratio may be approximately 30:1.

Again, when a valid connection between the power adapter and electronic device is detected, it may be desirable to activate an LED on the power plug to indicate this. Accordingly, an LED may be provided in a power plug. In this example, the LED is driven by a current source controlled by a programmable switch. This programmable switch may be a programmable I/O circuit, such as the DS2413 provided by Maxim Integrated Products of Sunnyvale, Calif., though in other embodiments of the present invention, other switches may be used. Again, once a connection is detected, the power adapter may instruct the programmable switch to turn on the LED, thereby indicating the presence of a connection between the power adapter and the electronic device or system.

Under some conditions, a user may later turn off the system. At that time, the system may instruct the programmable switch to turn off the LED. Under other conditions, however, the power adapter may experience an asynchronous disconnect. That is, a user may simply pull the plug from the system. In this case, the power adapter may turn off the power FET MPOWER, which may shut off the LED.

Again, wires 700 may be used to transmit data. Examples of state diagrams and associated circuitry are shown the following figures.

Figure 10:
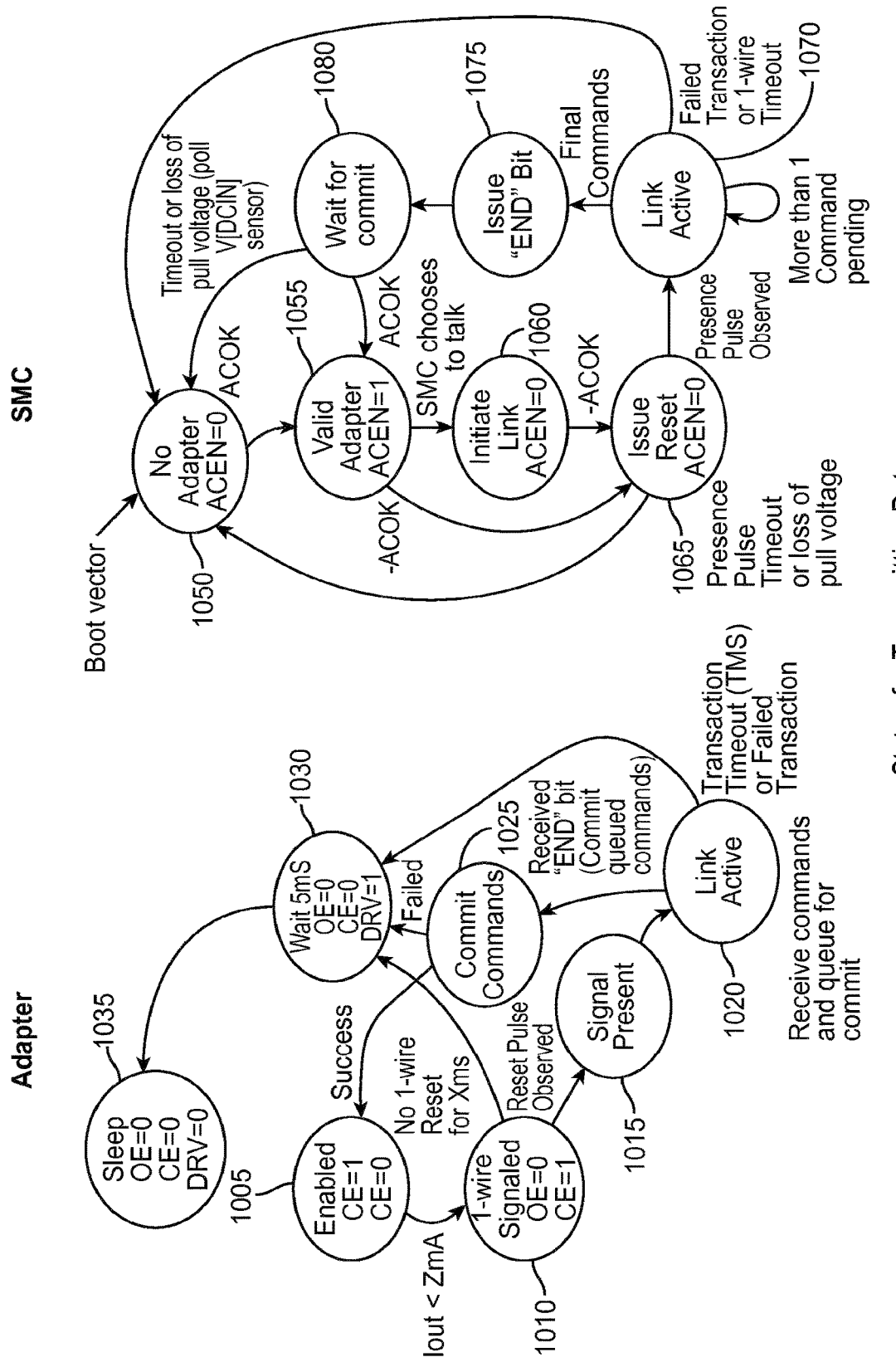
FIG. 10 illustrates state diagrams for transmitting data between an adapter and an electronic device according to an embodiment of the present invention.

FIG. 10 illustrates state diagrams for transmitting data between an adapter and an electronic device according to an embodiment of the present invention. Initially, the power adapter may be enabled in state 1005. If current drops below a set level, the power adapter may understand that the electronic device may initiate communications. Following a response signal provided by the power adapter in state 1015, the power adapter may enter the link active states 1020. In this state, signals may be provided and received. After an end bit is received from the electronic device, the power adapter may enter state 430 and continue providing power to the electronic device.

Upon power up of the electronic device, state 1050 may be entered. Once power is received from the power adapter, the presence of a valid power adapter may be detected in state 1055. In this state, power may be received by the electronic device from the power adapter, and one of two things may happen, either the power may be removed, or the electronic device may wish to initiate communications. If power is disconnected, a reset signal may be issued in state 1065, essentially inquiring whether the power adapter has been disconnected. If the powered adapter has been disconnected, no response will be received, and the state machine may return the state 1050.

When the electronic device intends to initiate communications with a power adapter, state 1060 is entered, and the reset signal is issued in state 1065. If a return signal is observed, the link active state can be entered in state 1070. In this case, data may be transferred. Once data has been transferred, an end bit in state 1075 may be sent. This end bit may instruct all of the previous commands to be executed, though in other embodiments of the present invention, commands are executed as they are received. In state 1080, the electronic device may wait for a response from the power adapter. If no response is received, the electronic device may enter state 1050. If a response is received, the electronic device may continue to receive power in state 1055, and power may be provided from the power adapter to the electronic device.

Again, temperature data may be transmitted from the power adapter to the system. The system can use this data to monitor the power adapter and prevent overheating. In other embodiments of the present invention, other types of data may be transmitted between the power adapter and system. For example, identification data that includes current and voltage capabilities, adapter identification, and version information may be transmitted. Still other embodiments of the present invention may include fault logging. Faults, such as overheating, overvoltage, or over current faults, may be transmitted or stored by either or both the electronic device and the power adapter. For example, if a power adapter were to shut down due to overheating, it could record that data in a log for later retrieval. Also, this data could be transmitted by the power adapter to the system for diagnosis by the system.

Figure 11:
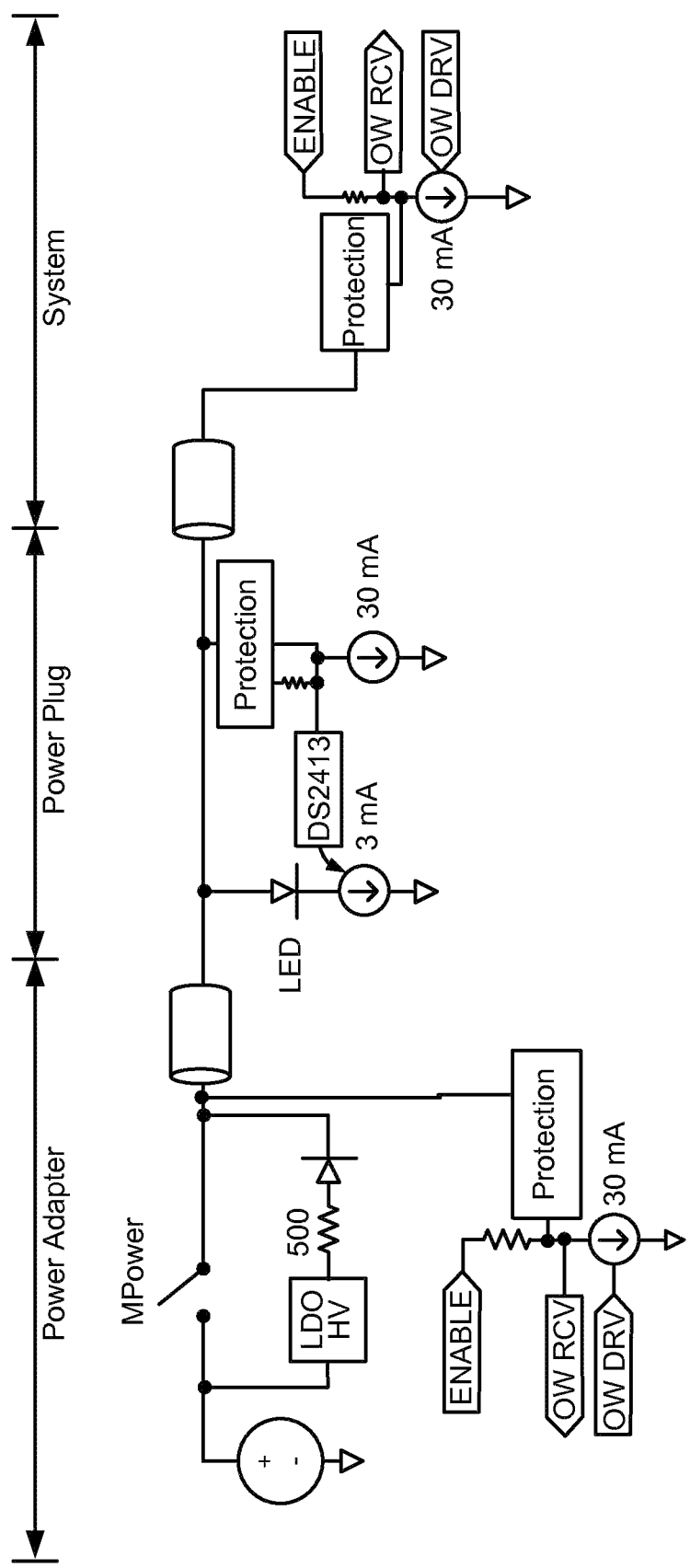
FIG. 11 illustrates circuitry for transmitting data according to an embodiment of the present invention.

FIG. 11 illustrates circuitry for transmitting data according to an embodiment of the present invention. Drive circuitry for sending and receiving data may be included in both the power adapter and system. Also, a current path to maintain the LED in an illuminated state during data transmission may be provided. In this specific example, an LDO provides a current through a 500 ohm resistor to the LED. An example of the drive circuitry that may be used in the power adapter and electronic device is shown in the following figure.

Figure 12:
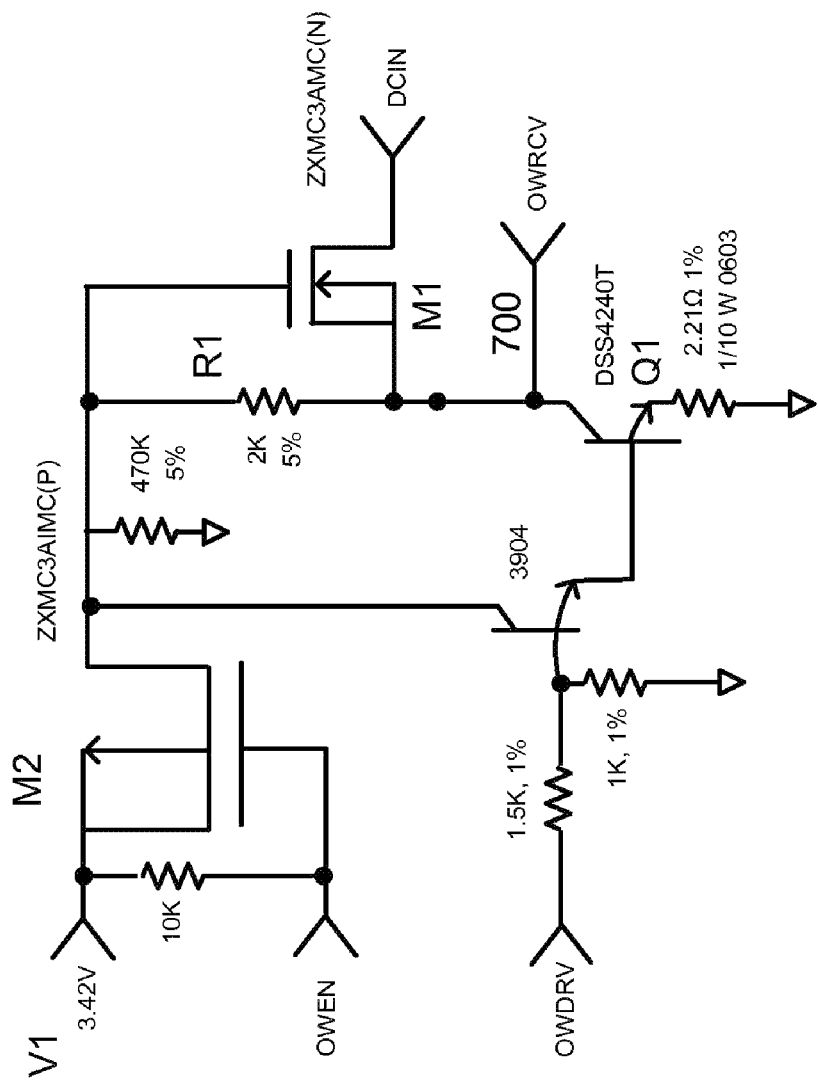
FIG. 12 is a schematic of a driver circuit according to an embodiment of the present invention.

FIG. 12 is a schematic of a driver circuit according to an embodiment of the present invention. In various embodiments of the present invention, this driver circuit may provide at least three functions. It may provide a low leakage path during connection detection, it may protect a microcontroller or other circuitry from high voltage during power transmission, and it may provide a strong pull-down during data transmission.

This drive circuitry may include transistor M1. Transistor M1 may be used to provide a high impedance for the drive circuitry when a connection is being detected. Transistors M2 may be provided to isolate microcontroller power supply V1 from high voltages provided on wires 700 during power transmission. During signaling, a low signal may be provided by transistor Q1. Specifically, transistor Q1 may turn on and pull wire 700 low. Resistor R1 may be included as a pull up to provide a high signal level on wire 700.

In various embodiments of the present invention, other circuitry may be used consistent with embodiments of the present invention. Examples are shown in the following figures.

Figure 13:
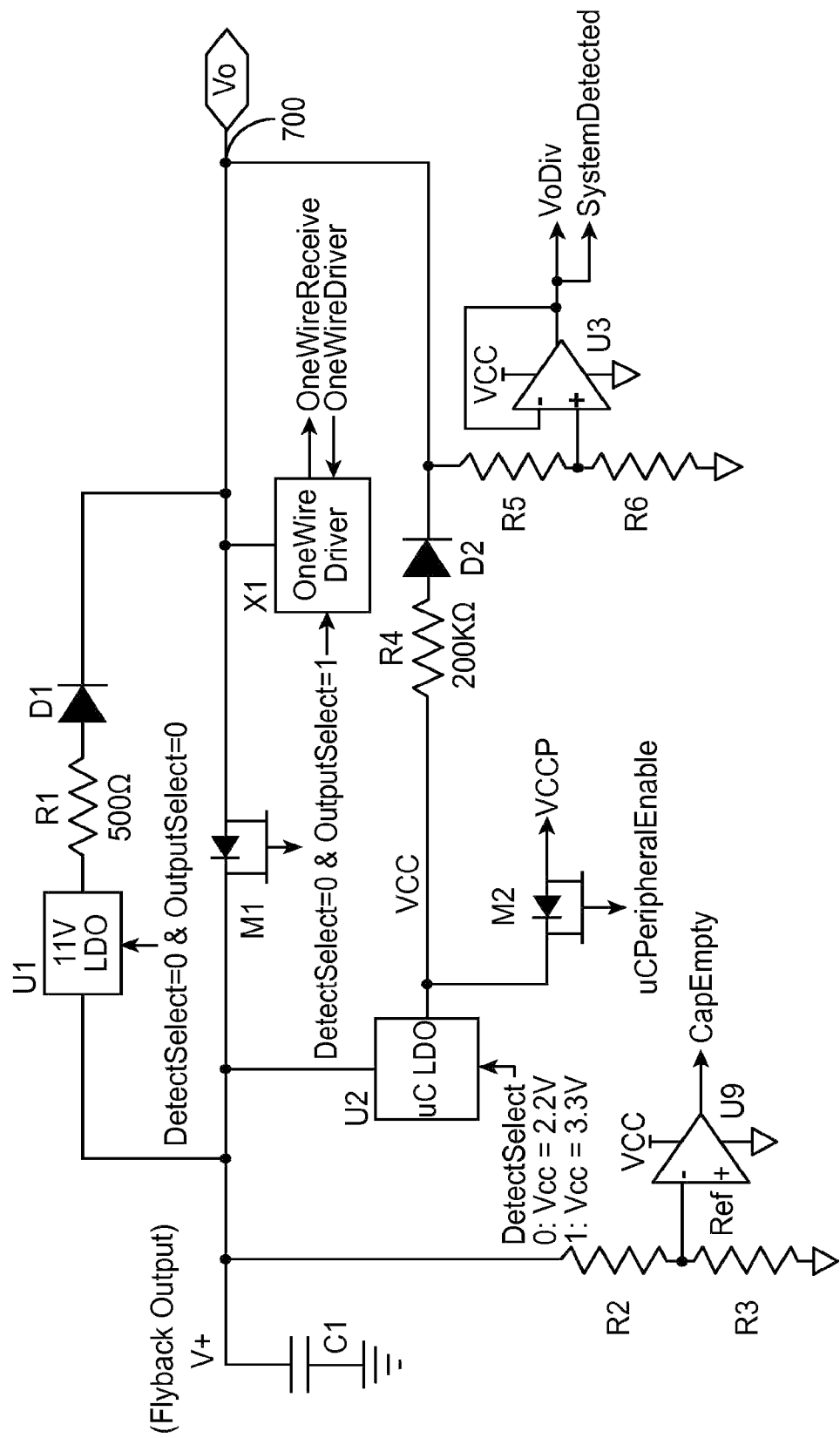
FIG. 13 illustrates circuitry for a power adapter according to an embodiment of the present invention.

FIG. 13 illustrates circuitry for a power adapter according to an embodiment of the present invention. As before, this circuitry may include circuitry for at least three functions. Specifically, this circuitry may include circuitry to detect a connection to an electronic device, circuitry to transmit power to the electronic device, and circuitry to communicate with other circuitry, such as circuitry in a power plug or the electronic device.

In this specific example, detection circuitry is included. Specifically low dropout (LDO) regulator U2 may provide a low voltage to a terminal of resistor R4. This low voltage may be provided through resistor R4 and diode D2 to line VO 700, which may be a power conductor. Again, this may provide a fairly high impedance at terminals of a power plug, thereby protecting users from accidental exposure to potentially dangerous currents and voltages.

As before, a pull down resistor Rsys may reside in the electronic device. When Rsys is connected to line VO 700, the voltage on VO drops. This drop in voltage can be detected by comparator U3, which may provide a system detected signal. In other embodiments of the present invention, circuitry for U3 may be more sophisticated and may be able to detect various voltages on line VO. These various voltages may indicate various resistances for Rsys, thereby indicating a type of device being charged.

Also, in this specific embodiment of the present invention, power circuitry may be included to provide power from the power adapter to the electronic device. Specifically, a power supply is connected to terminal V+. Connector M1 may be enabled, thereby connecting line VO 700 to the power supply V+.

Also in this specific embodiment of the present invention, communication circuitry may be included. This circuitry may allow the power adapter to communicate with the electronic device, circuitry in a power plug, or other circuitry. This circuitry may include a low dropout regular U1. Low dropout regulator U1 may connect in series through resistor R1 and diode D1. This configuration may be used to ensure that an LED in the power plug remains illuminated during data communications.

The data communications may be achieved using a one-wire driver X1. An example of such a driver is shown in the following figure.

Figure 14:
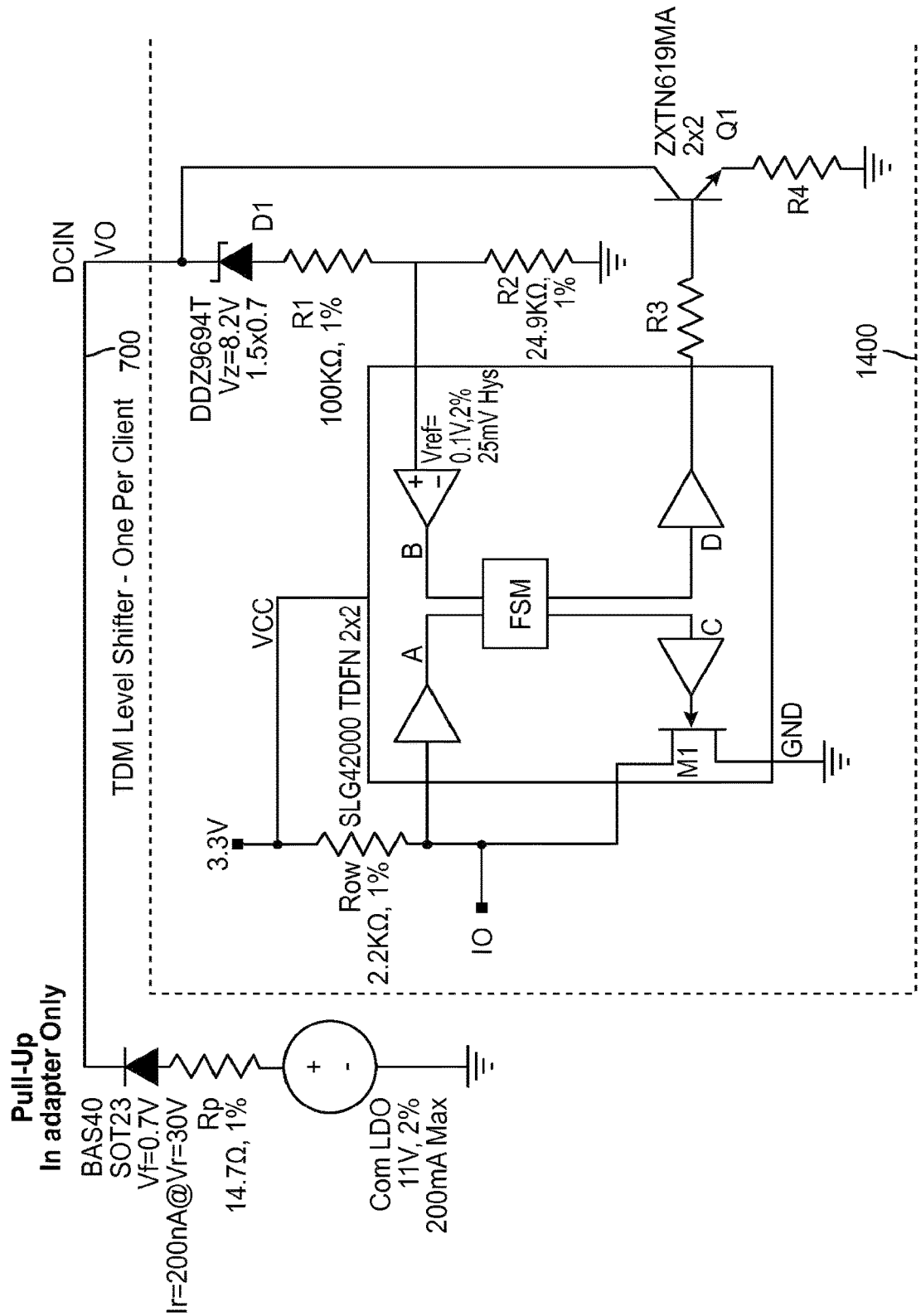
FIG. 14 illustrates a driver circuit according to an embodiment of the present invention.

FIG. 14 illustrates a driver circuit according to an embodiment of the present invention. Driver 1400 may communicate with an electronic circuit and circuitry in a power plug over wire via 700. As before, this driver may provide at least three functions.

First, during a detection, a high impedance may be provided such that the detection circuitry may operate properly. Specifically, Zener diode D1 is off at low voltages, such as the low voltage provided by U2 during detection, and therefore provides a high impedance during detection.

Second, during power transmission, protection from the high voltages is provided to the microcontroller circuitry. Again, Zener diode D1 steps off a significant portion of the high-voltage, while the resistor divider formed by resistors R1 and R2 divides down the remaining voltage.

Third, logic levels are provided on line VO 700. Specifically, transistor Q1 may pull down on line 700, while resistor Rp may provide a pull-up on line 700.

Data may be received by this circuit through diode D1 by buffer B. The buffer B may drive a finite-state machine, which in turn may drive buffer C. Buffer C may drive transistor M1, which in turn drives output line IO.

Data may be driven by this circuit by driving line IO, and thereby driving buffer A. Buffer A may drive the finite-state machine, which in turn may drive buffer B. Buffer B may drive transistor Q1, which may drive line VO 700.

In various embodiments of the present invention, a state machine may be used to resolve conflicts between the incoming and outgoing data paths. For example, in various configurations, without a finite state machine, the four buffers (or comparators) and associated transistors may latch into a stable state. In other configurations, without the finite-state machine, the four buffers and associated transistors may oscillate. Accordingly, to resolve these conflicts, a finite-state machine may be used. An example of such a state machine is shown in the following figure.

Figure 15:
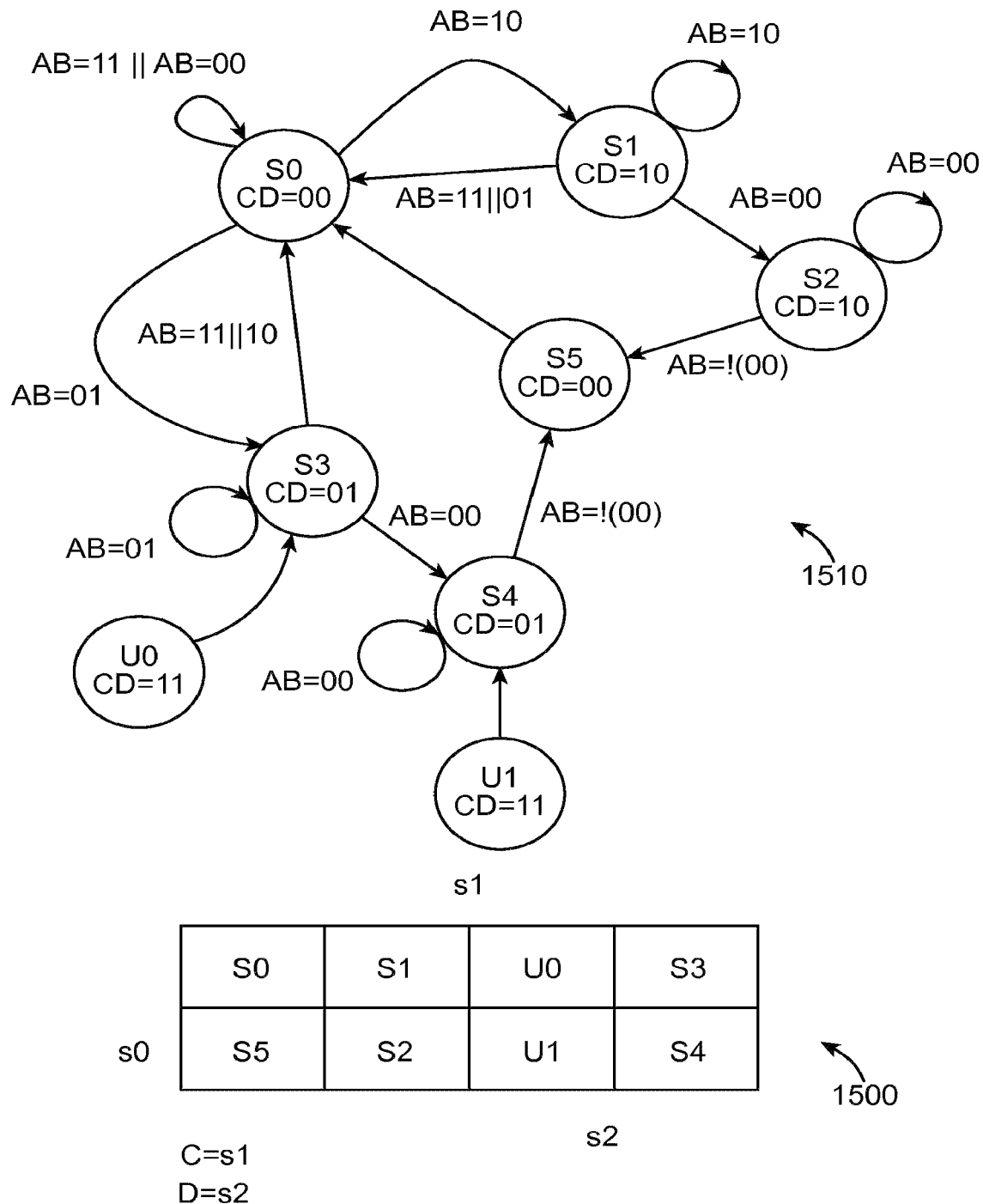
FIG. 15 illustrates a finite-state machine according to an embodiment of the present invention.

FIG. 15 illustrates a finite-state machine according to an embodiment of the present invention. This state machine may be asynchronous, that is, it is not clocked. In other embodiments of the present invention, this state machine may be clocked.

In this example, eight total states are mapped by the look-up table 1500. State diagram 1510 illustrates various states of the finite-state machine. For example, if the present state is S0, and the inputs A and B change to a zero and a one respectively, the finite state machine may move to state S3.

Two additional or unused states U0 and U1 unconditionally move to known states S3 and S4 in order to avoid a stable condition in the event that one of these states is accidentally entered. Such an accidental entry may be caused by power glitches or other transitory conditions.

Again, the detection circuitry shown in FIG. 7 may be used to identify a value of a system identification resistor in an electronic device or system. This value may then be used to verify that a valid connection between a power adapter and electronic device has been made. In other embodiments of the present invention, other information about the electronic device may be determined from the value of the system resistor. For example, a current receiving capability, device type, or other information about the electronic device may be indicated by the value of the system resistor.

Unfortunately, various factors, such as leakage currents, diode voltage drops, and other error terms, may reduce the accuracy of this measurement. In order to improve such measurements, a differential voltage may be detected. That is, two detection measurements may be made. These measurements may be subtracted from each other or otherwise used to more accurately measure the system resistor. An example is shown in the following figure.

Figure 16:
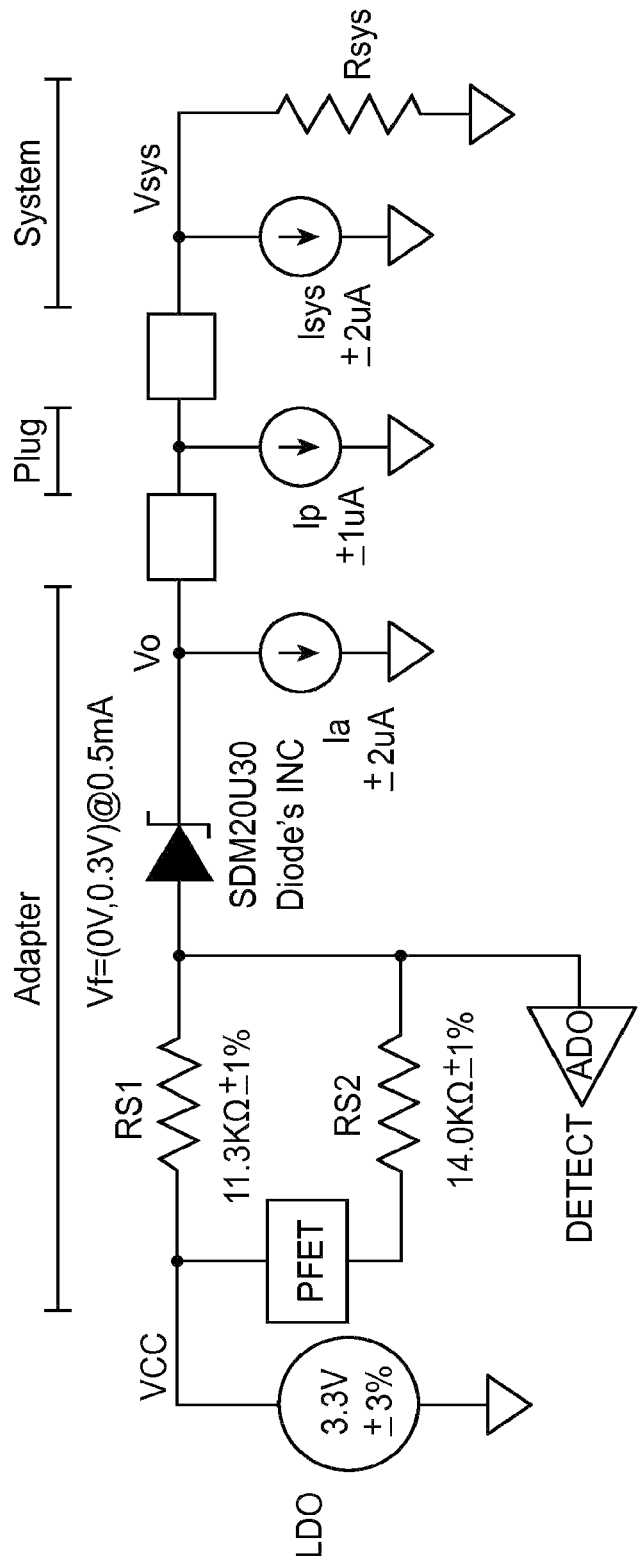
FIG. 16 illustrates another detection circuit according to an embodiment of the present invention.

FIG. 16 illustrates another detection circuit according to an embodiment of the present invention. This detection circuitry includes detection circuitry in a power adapter and in an electronic device or system.

As before, a low dropout regulator may provide a voltage through a resistor RS1 in the power adapter to a system resistor Rsys, located in the electronic device or system. When a valid connection is made between the power adapter and the electronic device, a resulting voltage may be detected by an analog-to-digital converter.

In this example, a second measurement may be made by connecting a second resistor RS2 in parallel with resistor RS1. Specifically, a switch, shown here as a p-channel field-effect transistor, may be closed, thereby shorting resistor RS2 across resistor RS1. The field-effect transistor may be in a first state (for example, off) until a voltage in a first range is detected by the analog-to-digital converter. Once such a voltage is detected, control circuitry may change the state of the field-effect transistor (for example, to on), and a second voltage may be detected.

This change in impedance in series with the low dropout regulator may result in a change in a voltage detected by the analog-to-digital converter. These two detected voltages may be subtracted from each other to generate a differential voltage. This differential voltage may then be used to determine the value of the system resistor. Using such a differential measurement may reduce the effects of various leakage currents, diode drops, ground drops, and other error terms. While various nonlinear errors, such as nonlinearities associated with the diode, may largely remain, the accuracy of the measurement may be increased by using such a differential measurement.

While in this embodiment of the present invention a differential measurement is made by switching a second resistor in parallel with a first resistor, in other embodiments of the present invention, other circuit techniques may be used. For example, a voltage provided by the low dropout regulator may be varied. In other embodiments of the present invention, a second resistor in series with the first resistor may be switched in and out and a differential measurement may be made.

On occasion, it may be desirable to connect a power adapter to an electronic device or system, where the power adapter and electronic device are not compatible. For example, a power adapter may have a connector insert that has a first form factor, while the electronic device may have a receptacle for receiving connector inserts having a second form factor. Accordingly, embodiments of the present invention provide a connector adapter or converter that allows for such a connection to be made. For example, the converter may have a receptacle that accepts connector inserts having a first form factor. The converter may also have a connector insert having the second form factor, such that the converter may be inserted into the electronic device or system. An example of a system including such as converter is shown in the following figure.

Figure 17:
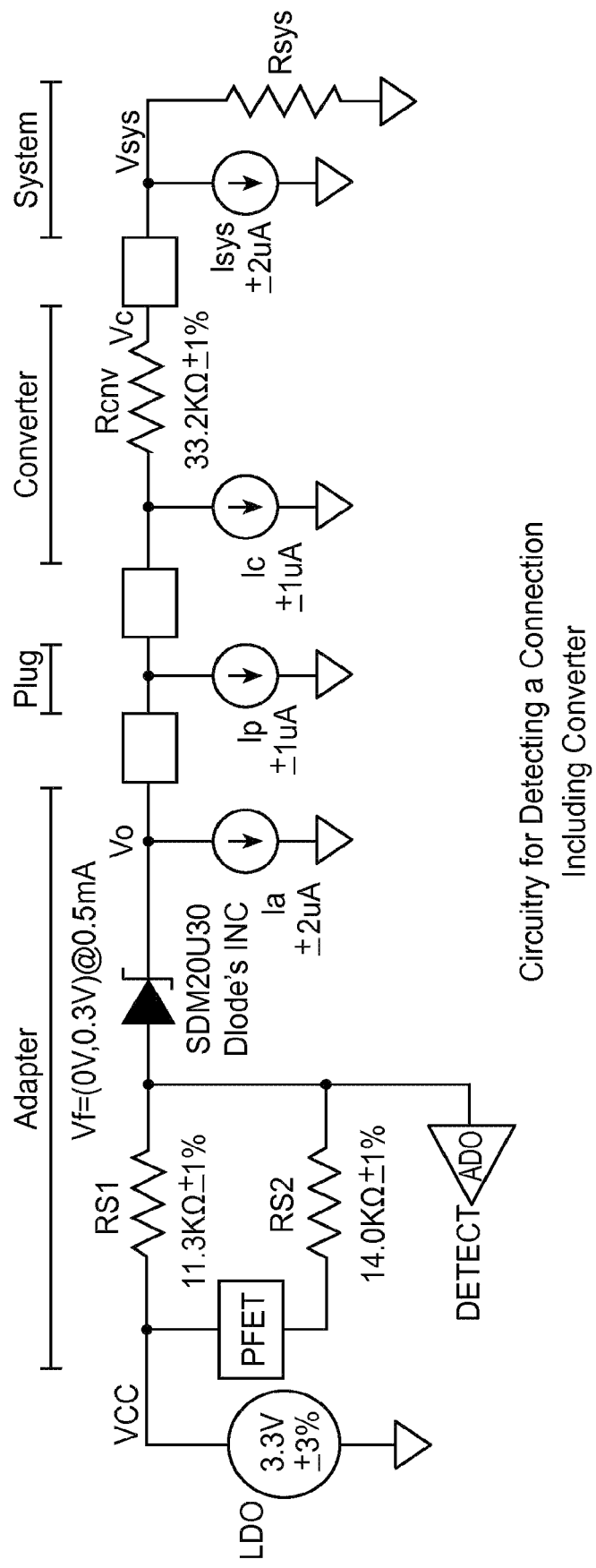
FIG. 17 illustrates a power adapter and an electronic device connected through a converter according to an embodiment of the present invention.

FIG. 17 illustrates a power adapter and an electronic device connected through a converter according to an embodiment of the present invention. This converter may include a converter resister that may be detected by a power adapter. More specifically, the series combination of the converter resister RCNV and the system resistor RSYS may be detected by the power adapter. This may inform the power adapter that a legacy (or other) device is being powered through a converter or connector adapter. Once power is to be applied to the system, the converter resister RCNV may be removed from the power path to avoid the power dissipation that would otherwise result. This may be done using a switch. An example of such a configuration is shown in the following figure.

Figure 18:
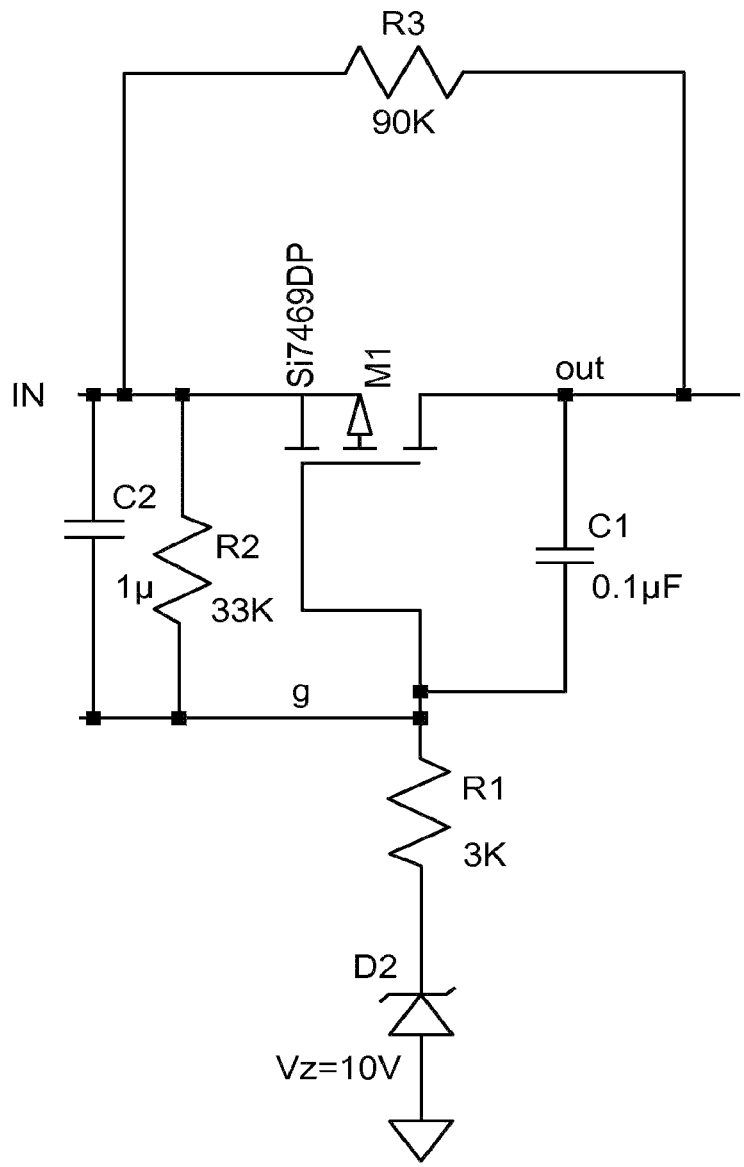
FIG. 18 illustrates circuitry for a converter or connector adapter according to an embodiment of the present invention.

FIG. 18 illustrates circuitry for a converter or connector adapter according to an embodiment of the present invention. In this example, an input terminal IN may be connected to a pin of a connector receptacle on the converter that accepts a connector insert that is coupled to a power adapter, while an output terminal OUT may be coupled to a pin of a connector insert that may mate with a connector receptacle housed in an electronic device.

This circuitry includes a detection resistor R3 in parallel with switch M1. During detection, the voltage received on line IN is low and switch M1 is off, and therefore resistor R3 may be detected by circuitry in the power adapter.

Once the presence of a valid connection has been determined, a voltage on line IN may rise. This increased voltage may result in a current through resistor R2, which may provide a gate-to-source voltage for transistor M1. This, in turn, may turn transistor M1 on, thereby shorting resistor R3 and allowing power to flow from the input terminal IN to the output terminal OUT.

In various embodiments of the present invention, additional circuitry, such as overvoltage protection, may be included in a converter according to an embodiment of the present invention. An example is shown in the following figure.

Figure 19:
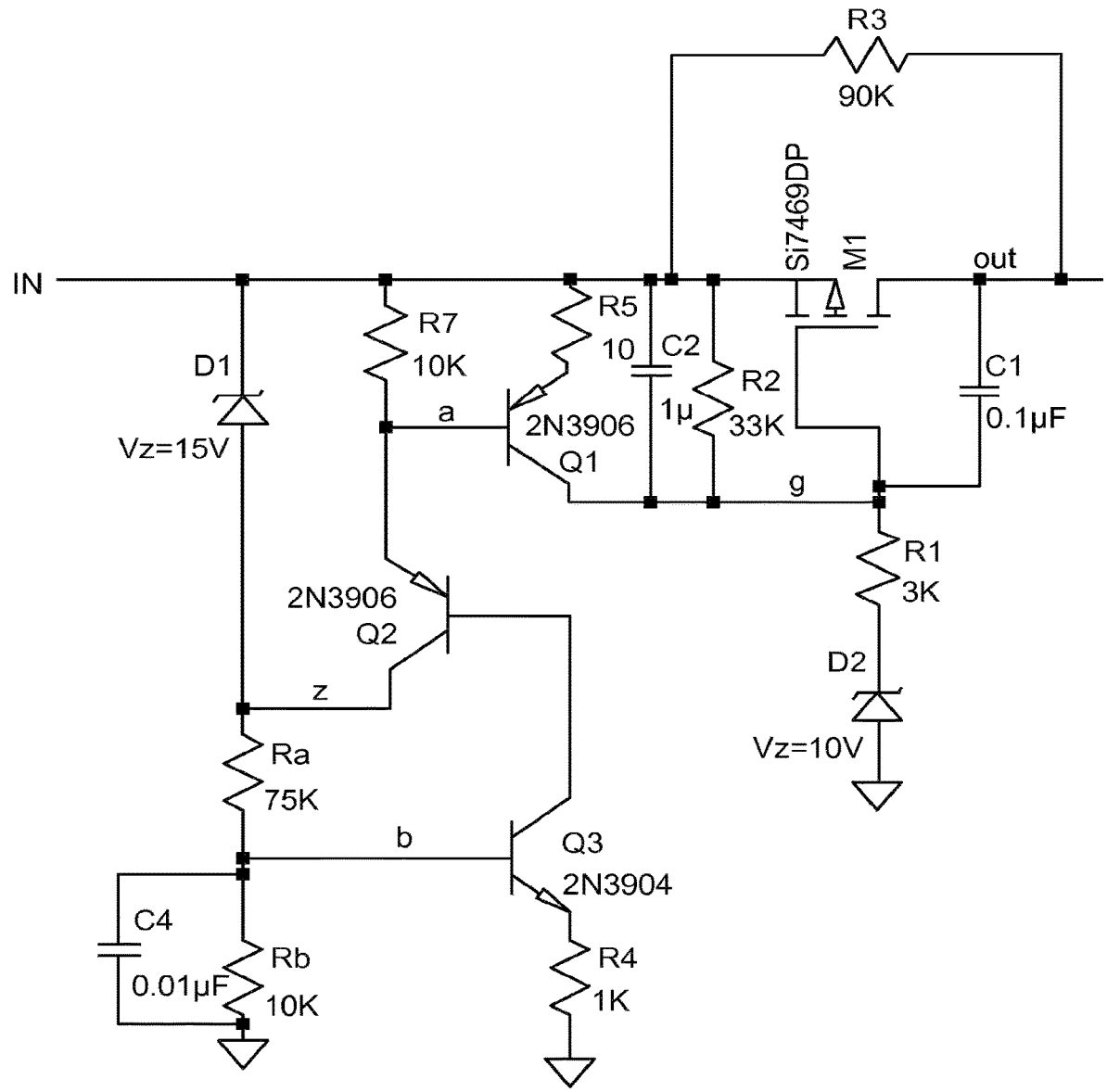
FIG. 19 illustrates circuitry for a converter or connector adapter according to an embodiment of the present invention.

FIG. 19 illustrates circuitry for a converter or connector adapter according to an embodiment of the present invention. This circuitry includes overvoltage circuitry connected to terminal IN. In summary, in overvoltage conditions, this circuitry turns on transistor Q1, thereby shorting resistor R2 and turning off transistor switch M1. This, in turn, places resistor R3 in series with the electronic device, thereby protecting the electronic device from the overvoltage condition.

In various embodiments of the present invention, a system resistor may be used to indicate the presence of a connection of an electronic device to a power adapter. Again, other information about the electronic device may be conveyed by a value of this resistor. In other embodiments of the present invention, other circuits may be used for this detection and identification. Examples are shown in the following figures.

Figure 20:
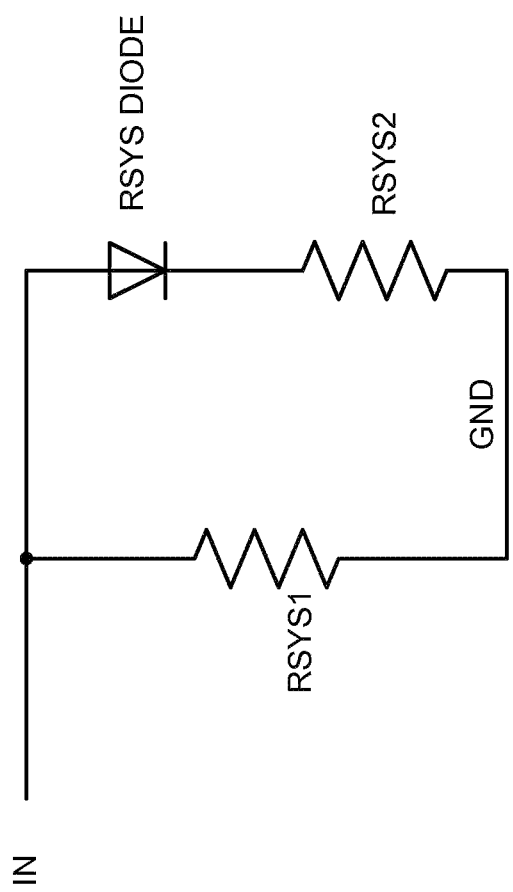
FIG. 20 illustrates a circuit that may be used for connection detection according to an embodiment of the present invention.

FIG. 20 illustrates a circuit that may be used for connection detection according to an embodiment of the present invention. This circuitry includes a first system resistor RSYS1 in parallel with a series combination of a diode RSYS DIODE and second system resistor RSYS2. When a low voltage is received on line IN, the diode may be off, and the load on line IN may be approximately the first system resistor RSYS1. As the voltage on line IN is increased, the load may change to a parallel combination of the first and second system resistors.

This two-step procedure may be used in various ways. For example, such a procedure may be much less likely to result in a mistaken connection detection. That is, while a stray impedance may lead a power adapter to incorrectly determine that a connection to an electronic device has been made, such an error is much less likely in such a dual impedance measurement. In other embodiments of the present invention, a first measurement may be used to determine the presence of a connection, while a second measurement may be used to convey information about the electronic device such as charging capability, device type identification, or other information.

Figure 21:
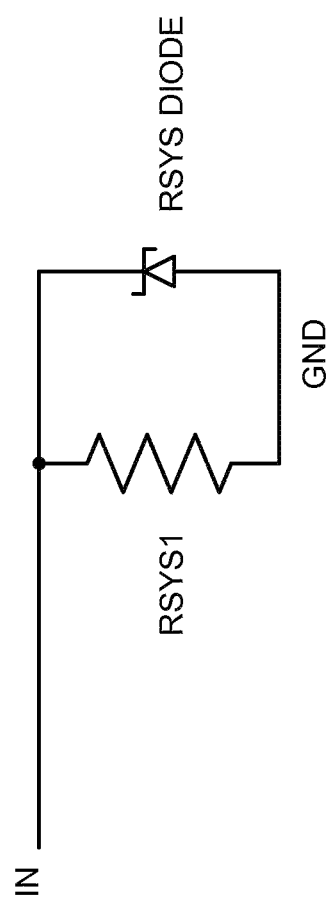
FIG. 21 illustrates another circuit that may be used for connection detection according to an embodiment of the present invention.

FIG. 21 illustrates another circuit that may be used for connection detection according to an embodiment of the present invention. This circuitry includes a system resistor RSYS1 in parallel with a diode RSYS DIODE. When a high voltage is received, the diode may clamp the input line IN. As this voltage is decreased, the load may appear to be equal to the system resistor RSYS. As before, this two-step process is much like is likely to result in an incorrect connection determination by a power adapter. Also, the clamp voltage or value of the system resistor, or both, may be used to convey information about the electronic device.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of operating an electronic device, the method comprising:
with a detection circuit in the electronic device, detecting a connection of a power adapter at an electronic device receptacle of the electronic device;
with a power circuit in the electronic device, drawing power from the power adapter at the electronic device receptacle;
with a controller in the electronic device, determining that power would be more efficiently provided by a battery internal to the electronic device;
with the controller in the electronic device, instructing the power adapter to not provide power to the electronic device receptacle; and
with the power circuit in the electronic device, while the power adapter remains connected at the electronic device receptacle, drawing power from the battery.

2. The method of claim 1 wherein detecting a connection of a power adapter at the electronic device receptacle comprises receiving a voltage at a first network from a power conductor, then comparing a resulting voltage on the power conductor to a threshold voltage.

3. The method of claim 2 wherein the first network comprises a resistor.

4. The method of claim 2 wherein the first network comprises a first resistor in parallel with a series combination of a second resistor and a diode.

5. The method of claim 2 wherein the first network comprises a resistor in parallel with a diode.

6. The method of claim 1 wherein the battery is a fuel-cell battery.

7. The method of claim 6 wherein the electronic device is a fuel-cell system.

8. The method of claim 1 further comprising, before drawing power from the battery, with the controller in the electronic device, requesting temperature data from the power adapter by sending a first signal using the electronic device receptacle.

9. The method of claim 1 further comprising, before drawing power from the battery, with the controller in the electronic device, requesting identification information from the power adapter by sending a first signal using the electronic device receptacle.

10. The method of claim 1 further comprising, before drawing power from the battery, with the controller in the electronic device, requesting charging capability information from the power adapter by sending a first signal using the electronic device receptacle.

11. An electronic device comprising:
- a detection circuit to detect a connection of a power adapter at an electronic device receptacle of the electronic device;
- a power circuit to draw power from the power adapter at the electronic device receptacle;
- a controller in the electronic device to determine that power would be more efficiently provided by a battery internal to the electronic device, and in response to determining that power would be more efficiently provided by the battery, to instruct the power adapter to not provide power to the electronic device receptacle; and
- the power circuit further to draw power from the battery while the power adapter remains connected at the electronic device receptacle.

12. The electronic device of claim 11 wherein detecting a connection of a power adapter at the electronic device receptacle comprises receiving a voltage at a first network from a power conductor, then comparing a resulting voltage on the power conductor to a threshold voltage.

13. The electronic device of claim 12 wherein the first network comprises a resistor.

14. The electronic device of claim 12 wherein the first network comprises a first resistor in parallel with a series combination of a second resistor and a diode.

15. The electronic device of claim 12 wherein the first network comprises a resistor in parallel with a diode.

16. The electronic device of claim 11 wherein the battery is a fuel-cell battery.

17. The electronic device of claim 16 wherein the electronic device is a fuel-cell system.

18. The electronic device of claim 11 wherein before the power circuit draws power from the battery, the controller requests temperature data from the power adapter by sending a first signal using the electronic device receptacle.

19. The electronic device of claim 11 wherein before the power circuit draws power from the battery, the controller requests identification information from the power adapter by sending a first signal using the electronic device receptacle.

20. The electronic device of claim 11 wherein before the power circuit draws power from the battery, the controller requests charging capability information from the power adapter by sending a first signal using the electronic device receptacle.

* * * * *